(12) United States Patent
Mason

(10) Patent No.: US 12,008,716 B2
(45) Date of Patent: Jun. 11, 2024

(54) SYSTEMS AND METHODS FOR GENERATING A SIMPLIFIED POLYGONAL MESH

(71) Applicant: Electronic Arts Inc., Redwood City, CA (US)

(72) Inventor: Ashton Mason, Brighton (GB)

(73) Assignee: Electronic Arts Inc., Redwood City, CA (US)

( * ) Notice: Subject to any disclaimer, the term of this patent is extended or adjusted under 35 U.S.C. 154(b) by 378 days.

(21) Appl. No.: 17/530,952

(22) Filed: Nov. 19, 2021

(65) Prior Publication Data
US 2023/0162445 A1    May 25, 2023

(51) Int. Cl.
*G06T 17/20* (2006.01)
(52) U.S. Cl.
CPC .................................. *G06T 17/205* (2013.01)
(58) Field of Classification Search
CPC .......................... G06T 17/205; G06T 2210/36
See application file for complete search history.

(56) References Cited

U.S. PATENT DOCUMENTS

| 8,166,042 B1* | 4/2012 | Praun ...................... G06F 16/29 707/921 |
| 8,970,583 B1* | 3/2015 | Overbeck ............... G06T 17/05 345/419 |
| 2004/0051711 A1* | 3/2004 | Dimsdale ............... G01B 11/24 345/419 |
| 2022/0051485 A1* | 2/2022 | Martin Brualla ....... G06T 15/20 |
| 2022/0130111 A1* | 4/2022 | Martin Brualla ......... G06T 7/40 |

OTHER PUBLICATIONS

Krus et al. Levels of Detail & Polygonal Simplification, 3D computer Graphics (Year: 1997).*
Garland et al. "Surface Simplification Using Quadric Error Metrics," Proceedings of the ACM SIGGRAPH Conference on Computer Graphics, pp. 1-8 (1997) (available at: https://www.ri.cmu.edu/pub_files/pub2/garland_michael_1997_1/garland_michael_1997_1.pdf).

(Continued)

*Primary Examiner* — Phuc N Doan
(74) *Attorney, Agent, or Firm* — Leydig, Voit & Mayer, Ltd.

(57) ABSTRACT

A method, device, and computer-readable storage medium for generating a simplified mesh. The method includes: receiving an input mesh that is a polygonal mesh; identifying one or more submeshes of the input mesh; fitting a set of shapes to the one or more submeshes to determine which shapes approximate which submeshes within a threshold value; for each submesh that is associated with at least one shape that approximates the submesh within the threshold value, generating a set of proxy levels-of-detail (LODs) for the submesh, wherein each proxy LOD is a polygonal mesh corresponding to the shape that approximates the submesh; generating for each submesh, a set of traditionally simplified levels-of-detail (LODs) based on simplifying the submesh; and generating the simplified mesh based on selecting one proxy LOD or one traditionally simplified LOD for each submesh of the one or more submeshes.

20 Claims, 13 Drawing Sheets

(56) References Cited

OTHER PUBLICATIONS

Funkhouser et al. "Adaptive Display Algorithm for Interactive Frame Rates During Visualization of Complex Virtual Environments," Proceedings of SIGGRAPH 1993, pp. 247-254 (Aug. 1993) (available at: https://www.researchgate.net/profile/Carlo-Sequin/publication/2328958_Adaptive_Display_Algorithm_for_Interactive_Frame_Rates_During_Visualization_of_Complex_Virtual_Environments/links/0046352097ce62f6ca000000/Adaptive-Display-Algorithm-for-Interactive-Frame-Rates-During- Visualization-of-Complex-Virtual-Environments.pdf).

Martello et al. "Knapsack Problems: Algorithms and Computer Implementations," John Wiley & Sons, Inc., ISBN 978-0-471-92420-3 (Nov. 1990).

Mason, Ashton. "Predictive Hierarchical Level of Detail Optimization," University of Cape Town, PhD dissertation (Jul. 1999) (available at: http://ashtonmason.net/papers/CS01-17-00.pdf).

Maciel et al. "Visual Navigation of Large Environments Using Textured Clusters," I3D '95: Proceedings of the 1995 Symposium on Interactive 3D Graphics, (Apr. 1995) (available at: https://www.cs.princeton.edu/courses/archive/spr01/cs598b/papers/maciel95.pdf).

\* cited by examiner

SYSTEMS AND METHODS FOR GENERATING A SIMPLIFIED POLYGONAL MESH

FIELD

This disclosure generally relates to computer graphics and, more particularly, to systems and methods for generating a generating a simplified polygonal mesh.

BACKGROUND

For three-dimensional (3D) graphics applications, such as video games or animated films, efficient processing of data by reducing computational complexity of a given operation is often useful. This is particularly the case in real-time applications, such as video games.

Various operations can be performed using computer generated objects in a scene. An object may be represented as a polygonal mesh, which comprises a collection of vertices, edges, and faces that define the shape and/or boundary of the object.

One optimization technique used in computer graphics involves using secondary meshes that are separate from a main graphics mesh of an object when performing operations. Objects may be modeled as polygonal meshes. In some implementations, secondary meshes, such as raycast meshes or shadow meshes, may be used for certain operations to reduce the computational complexity of the operations.

A raycast mesh, in some implementations, is a simplified polygonal mesh that approximates the overall shape of a main graphics mesh of an object. The raycast mesh may be used for operations such as ray casting, collision detection, and in support of AI (artificial intelligence) and physics operations. For example, ray-versus-triangle queries can be executed using the raycast mesh instead of using the main graphics mesh to reduce computational complexity. Example ray-versus-triangle queries are queries to determine (i) will this projectile hit this object, or (ii) can I see around this object, among others. The raycast mesh is not typically rendered, so texture coordinates (i.e., u-v coordinates) are not needed for raycast meshes. More aggressive mesh simplification can therefore be used when generating raycast meshes compared to traditional level-of-detail meshes (LODs).

One conventional approach to generating a raycast mesh is for artists to directly author a new mesh of an object to be used as a raycast mesh. Although raycast meshes are often authored by hand, raycast meshes created by artists are often too complex and fail to make enough use of aggressive simplification. This is partly because authoring raycast meshes is time-consuming and partly because generating a raycast mesh involves technical aspects (e.g., understanding physics and collisions), rather than being a purely artistic exercise. Thus, generating raycast meshes by artists does not play to the artist skill set. Also, artists may over-simplify (e.g., use too few triangles) for certain aspects of the object or may under-simplify (i.e., e.g., use too many triangles) for other aspects of the object.

Another conventional approach is to use traditional LODs for raycast meshes. One technique for generating traditional LODs involves edge collapse simplification. In on implementation of edge collapse simplification, a polygonal mesh is updated in a series of steps. In each step, two vertices of the polygonal mesh connected by an edge are replaced with a single vertex and the edge is removed. The edges that were previously connected to the two removed vertices are reconnected to the newly formed single vertex. Some problems with traditional edge collapse simplification are that (1) for meshes with many small components, edge collapse simplification can leave individual components in a degenerate state where they are neither well-formed nor completely removed, which cannot be well controlled, and (2) edge collapse simplification can decimate the existing mesh and cannot, for example, replace parts of the model with entirely new, simpler, representations that use a simpler topology or base design. As such, a traditional edge-collapse technique also does not work so well for raycast mesh generation when there are many small parts of the object.

For these reasons, systems and methods for generating improved simplified meshes, for example, raycast meshes, are needed.

SUMMARY

Embodiments of the disclosure provide a method, device, and computer-readable storage medium for generating a simplified mesh. The method includes: receiving an input mesh, wherein the input mesh comprises a polygonal mesh that is a computer representation of a three-dimensional (3D) object; identifying one or more submeshes of the input mesh, wherein each submesh of the one or more submeshes comprises a polygonal mesh; fitting a set of shapes to the one or more submeshes to determine which shapes in the set of shapes approximate which submeshes of the one or more submeshes within a threshold value; for each submesh that is associated with at least one shape that approximates the submesh within the threshold value, generating a set of proxy levels-of-detail (LODs) for the submesh, wherein each proxy LOD is a polygonal mesh corresponding to the shape that approximates the submesh; generating for each submesh of the one or more submeshes, a set of traditionally simplified levels-of-detail (LODs) for the submesh, wherein each traditionally simplified LOD is a polygonal mesh generated based on simplifying the submesh; and generating the simplified mesh based on selecting one proxy LOD or one traditionally simplified LOD for each submesh of the one or more submeshes.

DETAILED DESCRIPTION

Figure 1:
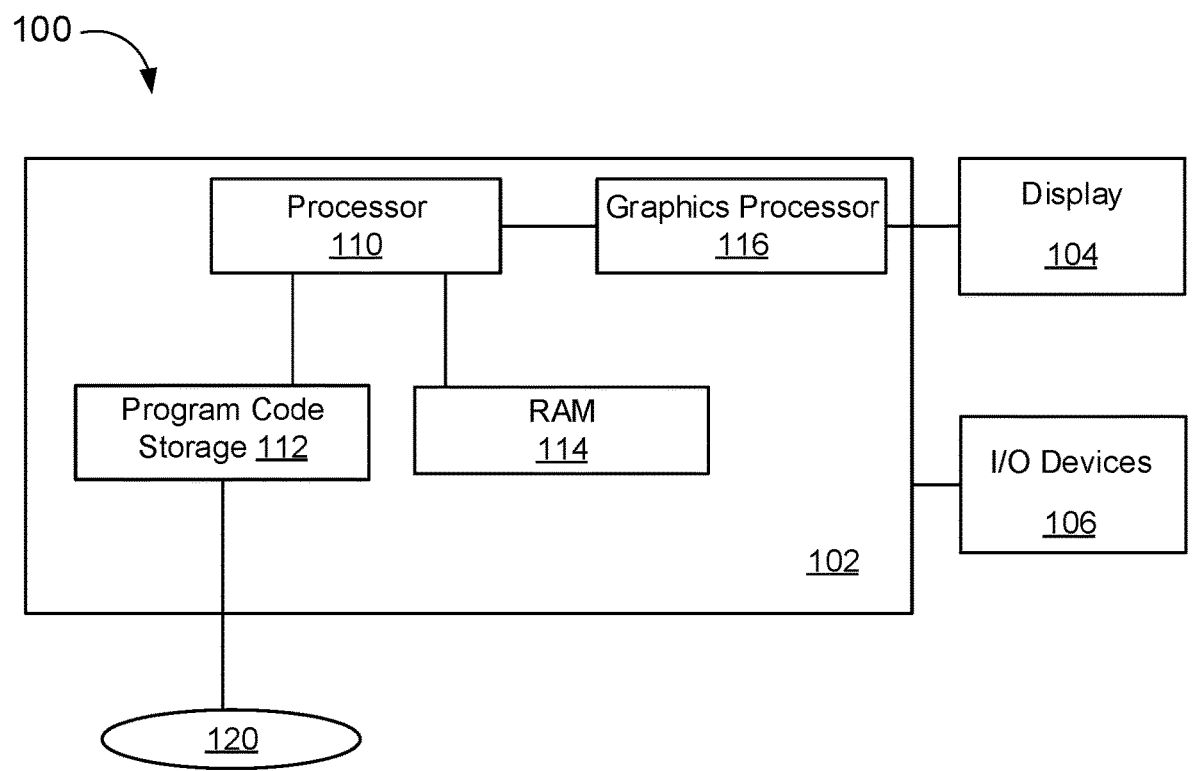
FIG. 1 is a block diagram of a computer system for rendering images, according to aspects of the present disclosure.

The following detailed description is exemplary in nature and is not intended to limit the disclosure or the application and uses of the disclosure. Furthermore, there is no intention to be bound by any expressed or implied theory presented in the preceding technical field, background, summary, brief description of the drawings, or the following detailed description.

Embodiments of the disclosure provide a system and method for procedural generation of simplified polygonal meshes, such as raycast meshes. Although targeted at generation of raycast meshes, the disclosed embodiments are generally applicable to mesh simplification, and raycast meshes are just one example implementation. For example, the disclosed system and method could also be used to generate other kinds of simplified meshes, such as LODs used for rendering and/or shadow meshes used for casting shadows.

Unlike traditional mesh simplification techniques (i.e., edge collapse), embodiments of the disclosure generate LODs for individual submeshes of an object. In some implementations, artist-authored objects are typically composed of multiple parts or submeshes. Embodiments of the disclosure can generate LODs for submeshes or groups of submeshes, and then pick between them using a global constrained optimization approach. The use of global optimization allows the disclosed embodiments to scale to different triangle budgets, more explicitly balancing and trading off the fidelity of the individual parts of objects, and using triangle budget freed up by the use of effective proxy LODs for parts of the object to improve the fidelity of other parts.

The disclosed embodiments combine traditional LOD generation with the opportunistic fitting of specialized "proxy" LODs, which are based on various kinds of fitted shapes, to both individual submeshes and groups of submeshes. A proxy LOD (or "imposter LOD") may be a simpler object (i.e., a simpler polygonal mesh) made to look like the artist-authored object or submesh. The proxy LOD can be used as a stand-in for the artist-authored object or submesh for performing operations involving the artist-authored object to reduce computational complexity.

Some embodiments use a scene description in which objects are organized as a hierarchy of submeshes. Leaf submeshes in the hierarchy can be organized into groups, in some embodiments. A mixture of different types of LODs may be provided for individual submeshes, and also for groups formed from individual submeshes. Multiple LODs can be provided for the same submesh or group at different triangle budgets. Some embodiments create groups of submeshes and fit proxy shapes to the groups, using heuristics that try to identify groups for which proxy shapes will be a good fit.

LODs are then selected from the hierarchy to form a simplified mesh for the overall object. The disclosed embodiments use benefit and cost metrics to evaluate the increased fidelity and computation cost associated with the use of a particular LOD for a given submesh or group. In some implementations, the benefit estimates calculated for LODs of a group of submeshes individually cannot be summed naively and compared to benefit estimates calculated for LODs of the group as a whole. Instead, in some embodiments, submeshes considered together form a "compound LOD" for the group of submeshes. By evaluating the LODs of the children of a group as "compound LODs" of the group, some embodiments are able to compare them meaningfully to LODs generated specifically for the group itself (e.g., proxy LODs for the group).

In various implementations, the compound LODs supplied for each group combine the LODs of the submeshes of the group in combinations selected using constrained optimization. The provision of compound LODs for groups allows the disclosed embodiments to generate complete representations of the model at any desired budget by combining the LODs of the top-level groups, while still benefiting from high-value proxy LODs fitted to both groups and individual submeshes. Proxy LODs fitted to individual submeshes and groups of submeshes "bubble up" through the compound LODs, being selected in preference to traditional LODs where it makes sense by the constrained optimization used to generate the compound LODs.

Taking the context of video games as an example, the display of a video game is generally a video sequence presented to a display device capable of displaying the video sequence. The video sequence typically comprises a plurality of frames. By showing frames in succession in sequence order, simulated objects appear to move. A game engine typically generates frames in real-time response to user input, so rendering time is often constrained.

As used herein, a "frame" refers to an image of the video sequence. In some systems, such as interleaved displays, the frame might comprise multiple fields or more complex constructs, but generally a frame can be thought of as a view into a computer-generated scene at a particular time or short time window. For example, with 60 frames-per-second video, if one frame represents the scene at t=0 seconds, then the next frame would represent the scene at t=1/60 seconds. In some cases, a frame might represent the scene from t=0 seconds to t=1/60 seconds, but in the simple case, the frame is a snapshot in time.

A "scene" comprises those simulated objects that are positioned in a world coordinate space within a view pyramid, view rectangular prism, or other shaped view space. In some approaches, the scene comprises all objects (that are not obscured by other objects) within a view pyramid defined by a view point and a view rectangle with boundaries being the perspective planes through the view point and each edge of the view rectangle, possibly truncated by a background.

The simulated objects can be generated entirely from mathematical models describing the shape of the objects (such as arms and a torso described by a set of plane and/or curve surfaces), generated from stored images (such as the face of a famous person), or a combination thereof. If a game engine (or more specifically, a rendering engine that is part of the game engine or used by the game engine) has data as to where each object or portion of an object is in a scene, the frame for that scene can be rendered using standard rendering techniques.

A scene may comprise several objects or entities with some of the objects or entities being animated, in that the objects or entities may appear to move either in response to game engine rules or user input. For example, in a basketball game, a character for one of the basketball players might shoot a basket in response to user input, while a defending player will attempt to block the shooter in response to logic that is part of the game rules (e.g., an artificial intelligence component of the game rules might include a rule that defenders block shots when a shot attempt is detected) and when the ball moves through the net, the net will move in response to the ball. The net is expected to be inanimate, but the players' movements are expected to be animated and natural-appearing. Animated objects are typically referred to herein generically as characters and, in specific examples, such as animation of a football, soccer, baseball, basketball, or other sports game, the characters are typically simulated players in the game. In many cases, the characters correspond to actual sports figures and those actual sports figures might have contributed motion capture data for use in animating their corresponding character. Players and characters might be nonhuman, simulated robots, or other character types.

In some cases, an artist-authored object that is visible in a scene can be composed of may sub-objects, each of which can be quite complex and include many surfaces. For example, for an object represented as a polygonal mesh, the object may be composed of a set of polygonal submeshes that form the complete object. As described herein, one technique for reducing the computational complexity of an operation involving an artist-authored object is to perform the operation using a simplified version of the artist-authored object. The simplified version can be used as a stand-in for the artist-authored object for performing operations involving the artist-authored object to reduce computational complexity. For example, the simplified version can be a raycast mesh used ray-versus-triangle queries or a shadow mesh used for generating shadows. In some implementations, the full resolution artist-authored object may not be needed for these operations, and so there are circumstances in which a lower resolution, simplified version is more appropriate in order to reduce the resource cost.

Turning to the drawings, FIG. 1 is a block diagram of a computer system 100 for rendering images, according to aspects of the present disclosure. The computer system 100 may be, for example, used for rendering images of a video game. The computer system 100 is shown comprising a console 102 coupled to a display 104 and input/output (I/O) devices 106. Console 102 is shown comprising a processor 110, program code storage 112, temporary data storage 114, and a graphics processor 116. Console 102 may be a handheld video game device, a video game console (e.g., special purpose computing device) for operating video games, a general-purpose laptop or desktop computer, or other suitable computing system, such as a mobile phone or tablet computer. Although shown as one processor in FIG. 1, processor 110 may include one or more processors having one or more processing cores. Similarly, although shown as one processor in FIG. 1, graphics processor 116 may include one or more processors having one or more processing cores.

Program code storage 112 may be ROM (read only-memory), RAM (random access memory), DRAM (dynamic random access memory), SRAM (static random access memory), hard disk, other magnetic storage, optical storage, other storage or a combination or variation of these storage device types. In some embodiments, a portion of the program code is stored in ROM that is programmable (e.g., ROM, PROM (programmable read-only memory), EPROM (erasable programmable read-only memory), EEPROM (electrically erasable programmable read-only memory), etc.) and a portion of the program code is stored on removable media such as a disc 120 (e.g., CD-ROM, DVD-ROM, etc.), or may be stored on a cartridge, memory chip, or the like, or obtained over a network or other electronic channel as needed. In some implementations, program code can be found embodied in a non-transitory computer-readable storage medium.

Temporary data storage 114 is usable to store variables and other game and processor data. In some embodiments, temporary data storage 114 is RAM and stores data that is generated during play of a video game, and portions thereof may also be reserved for frame buffers, depth buffers, polygon lists, texture storage, and/or other data needed or usable for rendering images as part of a video game presentation.

In one embodiment, I/O devices 106 are devices a user interacts with to play a video game or otherwise interact with console 102. I/O devices 106 may include any device for interacting with console 102, including but not limited to a video game controller, joystick, keyboard, mouse, keypad, VR (virtual reality) headset or device, etc.

Display 104 can any type of display device, including a television, computer monitor, laptop screen, mobile device screen, tablet screen, etc. In some embodiments, I/O devices 106 and display 104 comprise a common device, e.g., a touchscreen device. Still further, in some embodiments, one or more of the I/O devices 106 and display 104 is integrated in the console 102.

In various embodiments, since a video game is likely to be such that the particular image sequence presented on the display 104 depends on results of game instruction processing, and those game instructions likely depend, in turn, on user inputs, the console 102 (and the processor 110 and graphics processor 116) are configured to quickly process inputs and render a responsive image sequence in real-time or near real-time.

Various other components may be included in console 102, but are omitted for clarity. An example includes a networking device configured to connect the console 102 to a network, such as the Internet.

Figure 2:
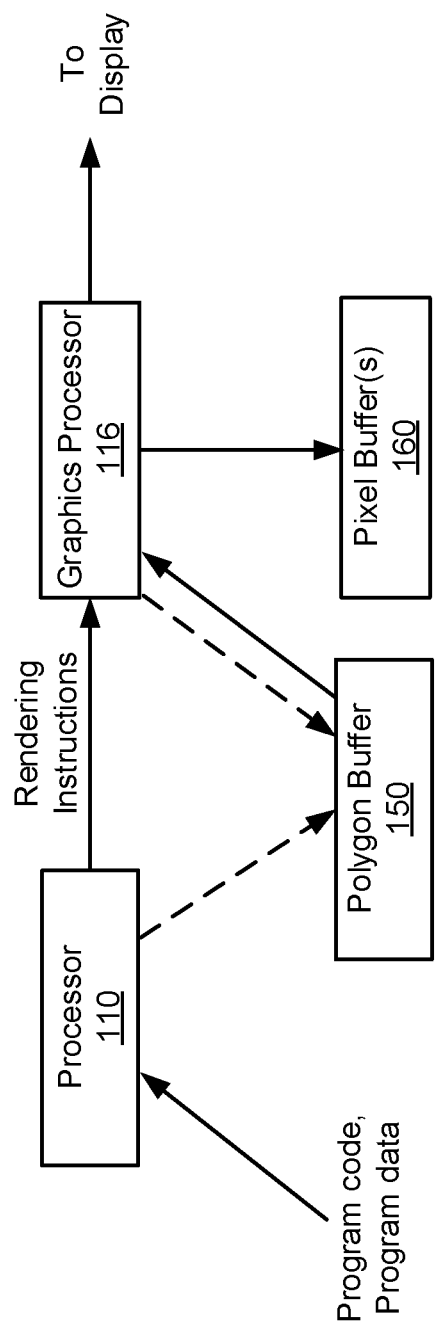
FIG. 2 is a block diagram illustrating processor and buffer interaction, according to one embodiment.

FIG. 2 is a block diagram illustrating processor and buffer interaction, according to one embodiment. As shown in FIG. 2, processor 110 executes program code and program data. In response to executing the program code, processor 110 outputs rendering instructions to graphics processor 116. Graphics processor 116, in turn, reads data from a polygon buffer 150 and interacts with pixel buffer(s) 160 to form an image sequence of one or more images that are output to a display. Alternatively, instead of sending rendering instructions to graphics processor 116 or in addition to sending rendering instructions to graphics processor 116, processor 110 may directly interact with polygon buffer 150. For example, processor 110 could determine which objects are to appear in a view and provide polygon or other mathematical representations of those objects to polygon buffer 150 for subsequent processing by graphics processor 116.

In one example implementation, processor 110 issues high-level graphics commands to graphics processor 116. In some implementations, such high-level graphics commands might be those specified by the OpenGL specification, or those specified by a graphics processor manufacturer.

In one implementation of an image rendering process, graphics processor 116 reads polygon data from polygon buffer 150 for a polygon, processes that polygon and updates pixel buffer(s) 160 accordingly, then moves on to the next polygon until all the polygons are processed, or at least all of the polygons needing to be processed and/or in view are processed. As such, a renderer processes a stream of polygons, even though the polygons may be read in place and be a finite set, where the number of polygons is known or determinable. For memory efficiency and speed, it may be preferable in some implementations that polygons be processed as a stream (as opposed to random access, or other ordering), so that fast, expensive memory used for polygons being processed is not required for all polygons comprising an image.

In some embodiments, processor 110 may load polygon buffer 150 with polygon data in a sort order (if one is possible, which might not be the case where there are overlapping polygons), but more typically polygons are stored in polygon buffer 150 in an unsorted order. It should be understood that although these examples use polygons as the image elements being processed, the apparatus and methods described herein can also be used on image elements other than polygons.

Figure 3:
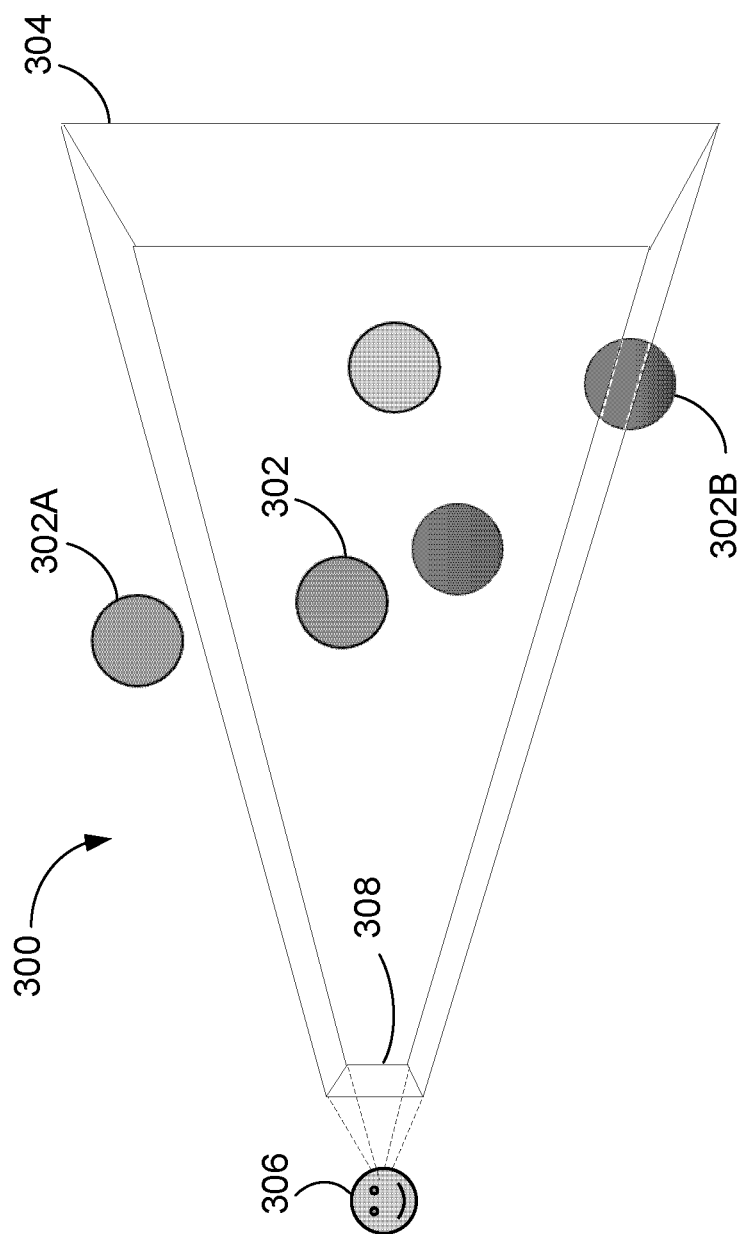
FIG. 3 is a block diagram of a scene to be rendered, according to one embodiment.

FIG. 3 is a block diagram of a scene 300 to be rendered, according to one embodiment. The scene 300 includes a plurality of 3D (three-dimensional) objects, including objects 302, 302A, 302B, for example. Each object can be comprised of a set of polygons, e.g., triangles. A camera 306 is configured to capture an image of the scene 300. A projection of the scene 300 is captured by the camera 306 and is represented by screen space 308. The view of the scene 300 captured by the camera 306 is represented by viewport 304. As shown, some of the objects, such as object 302A of the scene 300, may be outside the viewport 304. As also shown, some of the objects, such as object 302B, may be partially outside the viewport 304.

In one embodiment, the image of the scene 300 that is displayed on a display device corresponds to the screen space 308. The view of the scene 300 that the camera 306 can see (i.e., the image represented by screen space 308) can change as the camera 306 moves in 3D space relative to the objects in the scene. Also, the objects can move in the scene 300.

Figure 4B:
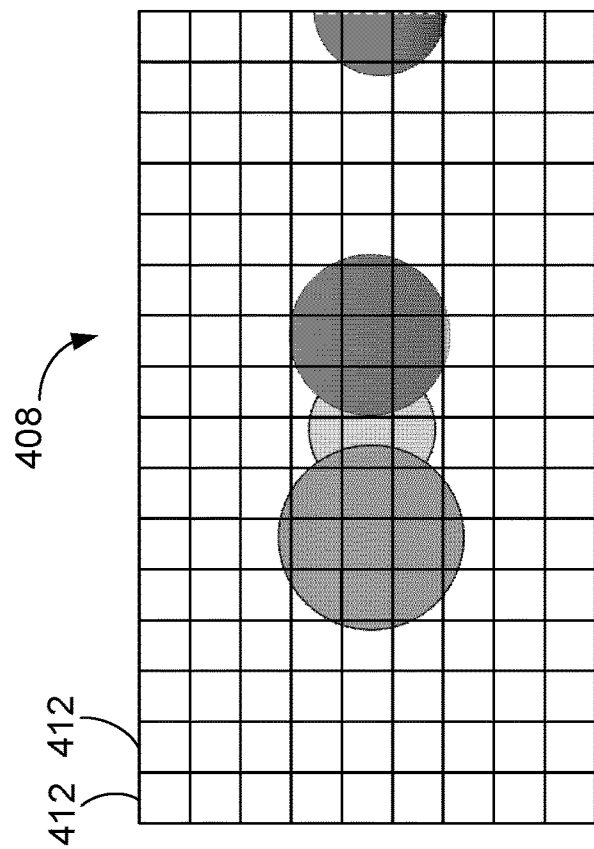
FIG. 4B is an example of an image of a scene, according to one embodiment.
Figure 4A:
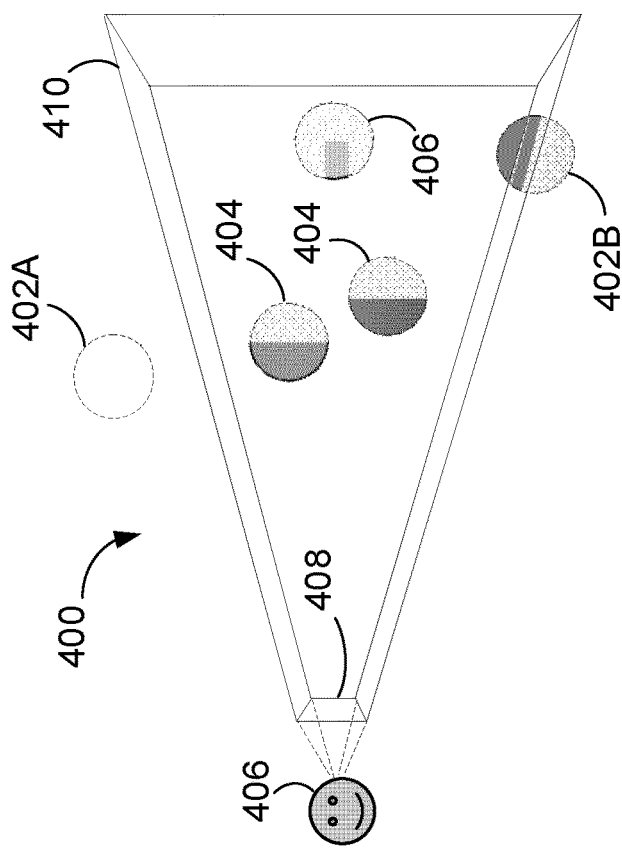
FIG. 4A is a block diagram illustrating rendering of a scene, according to one embodiment.

FIG. 4A is a block diagram illustrating rendering of a scene 400, according to one embodiment. Similar to the diagram shown in FIG. 3, scene 400 includes a plurality of objects. A camera 406 is configured to capture an image of the scene 400, represented in screen space 408. The camera 406 observes the scene 400 through viewport 410.

Various techniques can be used to render the scene 400 in screen space, including rasterization, ray tracing, or other techniques. Rasterization strives to render the pixels as those that are directly visible from the camera 406. In some implementations, rasterization can provide good performance when the renderer (e.g., processor 110 and/or graphics processor 116) does not need any global information about the scene 400.

One rasterization algorithm takes the 3D scene 400, which is described as objects comprising polygons, and renders the scene onto a 2D surface, usually a computer monitor, in screen space 408. The polygons are themselves represented as collections of triangles. Each triangle is represented by three vertices in 3D space. At a very basic level, rasterizers take a stream of vertices, transform them into corresponding 2D points in screen space 408, and fill in the transformed 2D triangles as appropriate.

Rasterization typically involves culling one or more objects or partial objects. Frustum culling removes any objects outside the viewport 410, such as object 402A. Viewport culling removes portions of objects that are partially overlapping the edge of the viewport 410, such as a portion of object 402B. Backface culling removes a back portion 404 of objects that cannot be seen by the camera 406. In some embodiments, depth testing can be performed to remove, on a per pixel basis in screen space 408, portions 406 of objects that are occluded by other objects.

When rasterization is complete, an image of scene in screen space 408 is generated. In some embodiments, pixel density of the screen space 408 can also result in information loss about the objects in the scene 400.

FIG. 4B is an example of an image of a scene, according to one embodiment. The image shown in FIG. 4B represents the image in screen space 408 of the scene 400 captured by the camera 406 in FIG. 4A.

For each pixel 412 in screen space 408, the processor has access to data corresponding to the position of the object within the pixel, the color of the object, the object's orientation, properties of the object (e.g., transparency or translucency), and/or surface roughness information, etc. The result of rasterization is, therefore, a 2D image of the 3D scene.

Although rendering has been described herein using rasterization, other embodiments may involve rendering a scene using other techniques, such as ray tracing, ray casting, radiosity, or any other rendering technique or combination thereof.

Figure 5:
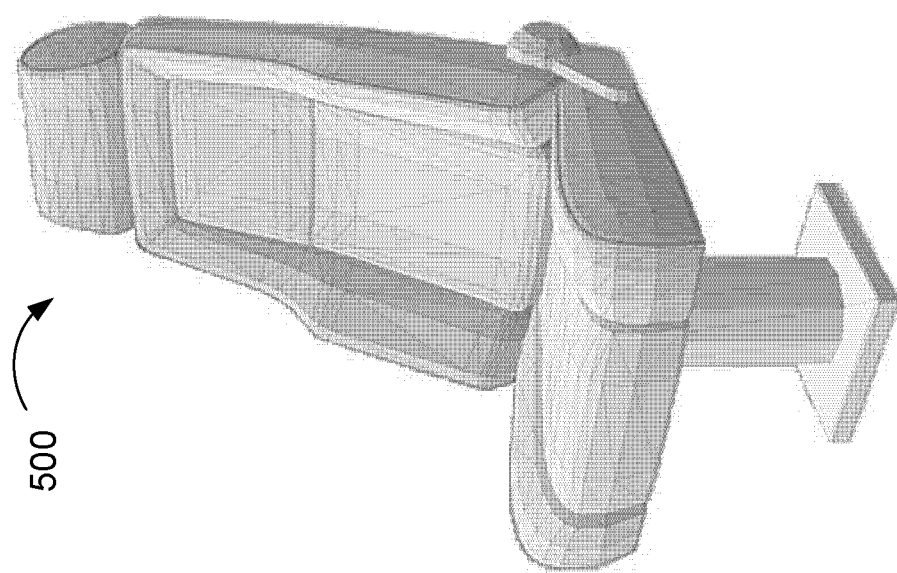
FIG. 5 is an example of a polygonal mesh, according to one embodiment.

FIG. 5 is an example of a polygonal mesh 500, according to one embodiment. As described, the polygonal mesh 500 may correspond to an artist-authored object. In the example shown, the object represents a chair. The polygonal mesh 500 comprises a collection of vertices, edges, and faces that define the shape and/or boundary of the artist-authored object. The faces may include various polygonal shapes, such as triangles, quadrilaterals, convex polygons, concave polygons, regular polygons (e.g., polygons that may have equal length sides and may have equal angles) and/or irregular polygons (e.g., polygons that may not have equal length sides and may not have equal angles).

In various embodiments, the polygonal mesh 500 may be comprised of one or more polygonal submeshes. Each submesh may itself include a series of polygons. As described above, a simplified mesh can be generated that represents the polygonal mesh 500 to be used in operations to reduce the computational complexity of the operations.

Figure 6:
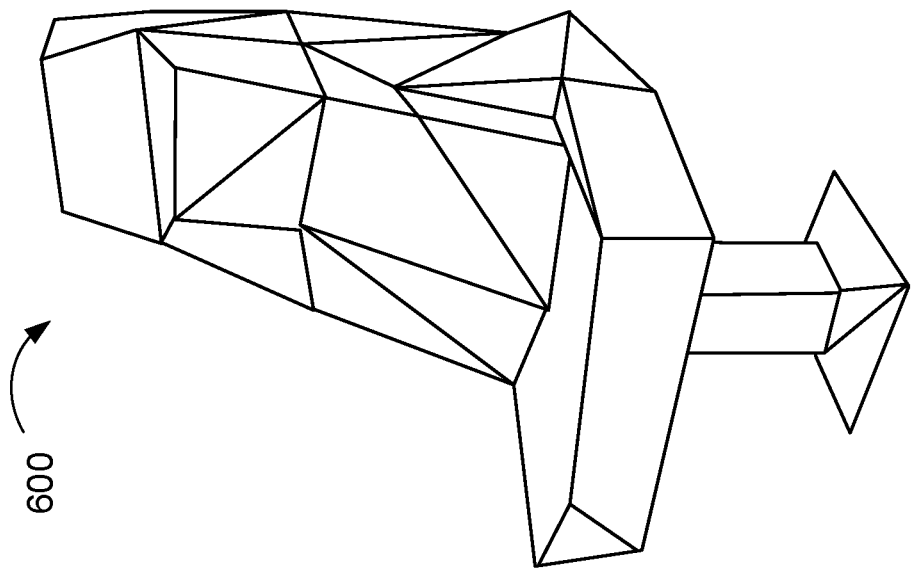
FIG. 6 is an example of a simplified mesh corresponding to the polygonal mesh in FIG. 5, according to one embodiment.

FIG. 6 is an example of a simplified mesh 600 corresponding to the polygonal mesh 500 in FIG. 5, according to one embodiment. As shown, the simplified mesh 600 is a polygonal mesh that includes a smaller number of faces, edges, and vertices compared to the polygonal mesh 500 in FIG. 5. The simplified mesh 600 can be, for example, a raycast mesh or a shadow mesh used for certain operations to reduce a resource cost. Using the simplified mesh 600 for graphics operations allows the polygonal mesh corresponding to the simplified mesh 600 to be stored using less space and may allow a computing device to perform operations that involve the simplified mesh 600 more easily and may allow a computing device to use fewer computing resources (e.g., using less processing power, less memory, etc.) when performing certain operations. As a result, the simplified mesh 600 is less expensive to store, process, render, etc. As used herein, the term "resource cost" is used to refer to the cost of computing resources in terms of storage, processing, rendering, etc.

As described in greater detail herein, embodiments of the disclosure provide systems and methods for mesh simplification. The disclosed embodiments begin by breaking the input polygonal mesh into the submeshes from which it was authored. In some implementations, this provides hints as to how the model is composed. Some embodiments use a range of mesh simplification techniques to generate LODs of the extracted submeshes. Then a global optimization algorithm is used to pick one LOD representation for each submesh, balancing detail levels across the model to maximize overall fidelity, subject to a triangle budget.

Artist-authored models are often built from a large number of relatively simple disconnected parts. One of the aspects of the disclosure is representing parts of the model by simple fitted "proxy" shapes such as boxes, cylinders, convex hulls, etc. In some implementations, the division of the input polygonal mesh into artist-authored submeshes presents a suitable level at which to fit proxy shapes. Some embodiments include specialized proxy LODs based on fitted shapes for extracted submeshes. By making these specialized LODs available to the global constrained optimization by which LODs are selected for the final raycast mesh, some embodiments benefit from their use where they provide better raycast fidelity per triangle than the traditionally simplified LODs that may be also available to choose from.

Another aspect of the disclosure is replacing groups of related submeshes with a single, shared, proxy LOD representation. Often, the submeshes of an input mesh can be grouped into sub-assemblies. While picking a very low-quality proxy LOD for a complex shape might seem like a step backward, it can be a win if it represents that shape particularly efficiently, saving triangles that are better used on other parts of the model that might not otherwise be afforded much detail from the overall triangle budget for the object. In this manner, the fidelity of the simplified mesh can be increased without exceeding the budget.

The desire to approximate groups of submeshes by shared proxy representations poses the problem of how to identify suitable groups. In a complex, previously unseen model there may be many conflicting ways to group submeshes. In order to not pre-suppose a particular grouping, some embodiments form groups on-the-fly using heuristics to generate possible groupings and then try to pick out useful candidate groups.

Some embodiments invert the grouping problem, phrasing it instead as a problem of splitting out subgroups from larger groups. Some embodiments initially group all submeshes together into one group. In some embodiments, the submeshes are grouped into a small number of groups based on material and/or proximity. Some embodiments then split out smaller groups from these initial groups using a series of heuristics that identify groups that are likely to be good fits for simple proxy LODs. Some embodiments associate with each initial submesh and each group a set of fitted shapes that are found to be good fits, and so might serve as the basis for useful proxy LODs.

Having built a hierarchy of groups, some embodiments generate LODs for each node of the hierarchy. For leaf submeshes, some embodiments generate a mixture of traditional LODs (i.e., traditionally simplified LODs using edge collapse techniques) and proxy LODs based on the shapes fitted to the submeshes. For groups of submeshes, some embodiments generate a mixture of proxy LODs (i.e., based on shapes fitted to the groups of submeshes) and "compound LODs," which are combinations of the LODs of the children of the group at different budgets.

Once LODs have been generated for each submesh and then for each group of submeshes, embodiments then select from among the LODs of each submesh or group to form a complete combined representation of the whole model, at any given budget. One embodiment performs the selection by considering only the LODs of the top-level groups. These LODs in the top-level groups may be traditionally simplified LODs (i.e., when a single leaf submesh forms a top-level group), proxy LODs fitted directly to those groups, or compound LODs that combine the LODs (i.e., both proxy LODs and traditionally simplified LODs) of the children of the group (and their children, and so on).

The disclosed system and method build a hierarchical graph of an object and then pick from the LODs associated with the nodes of the hierarchical graph to form a final simplified mesh at a given budget. The system and method are broadly comprised of three stages: (1) a grouping stage, in which a hierarchy is built and shapes are fitted to nodes in the hierarchy, (2) a LOD generation stage, in which LODs are generated for the nodes in the hierarchy, and finally (3) an optimization stage, in which a final mesh representation is formed by selecting from the available LODs. In some embodiments, aspects of these three stages may be interleaved.

1. Grouping Stage

During the grouping stage, submeshes are grouped with the aim of forming groups that are good fits for simple proxy shapes, such as boxes, cylinders, and hulls, etc. In various embodiments, the grouping is informed by shapes fitted initially to individual submeshes, and then to groups of submeshes formed by grouping. The result of grouping is a hierarchy in which submeshes can form groups, and those groups form larger groups, with shapes fitted both to individual submeshes and to groups. The shapes effectively "tag" the submeshes and groups as being potential good fits for proxy LODs of specific types. For example, a submesh that is roughly box-like might be tagged with an oriented box shape, effectively identifying that the box shape turned out to be a good fit for the submesh.

Figure 7A:
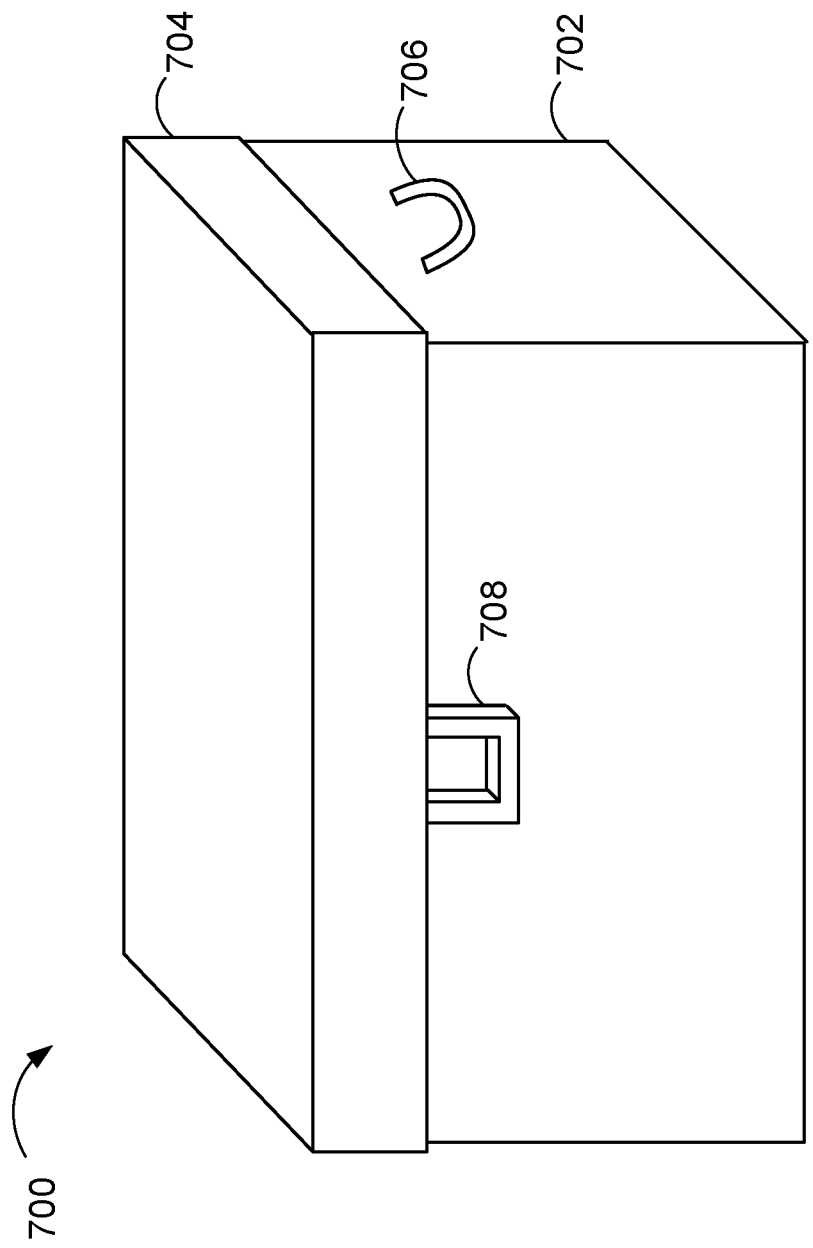
FIG. 7A is an example of a polygonal mesh corresponding to a chest object, according to one embodiment.

FIG. 7A is an example of a polygonal mesh 700 corresponding to a chest object, according to one embodiment. The polygonal mesh 700 is comprised of a series of polygons, e.g., triangles.

As shown in FIG. 7A, the chest object corresponding to the polygonal mesh 700 is comprised of multiple submeshes, including separate sub-meshes for a base 702, a lid 704, a handle 706, and a latch 708. Each of the submeshes is also a polygonal mesh.

Figure 7B:
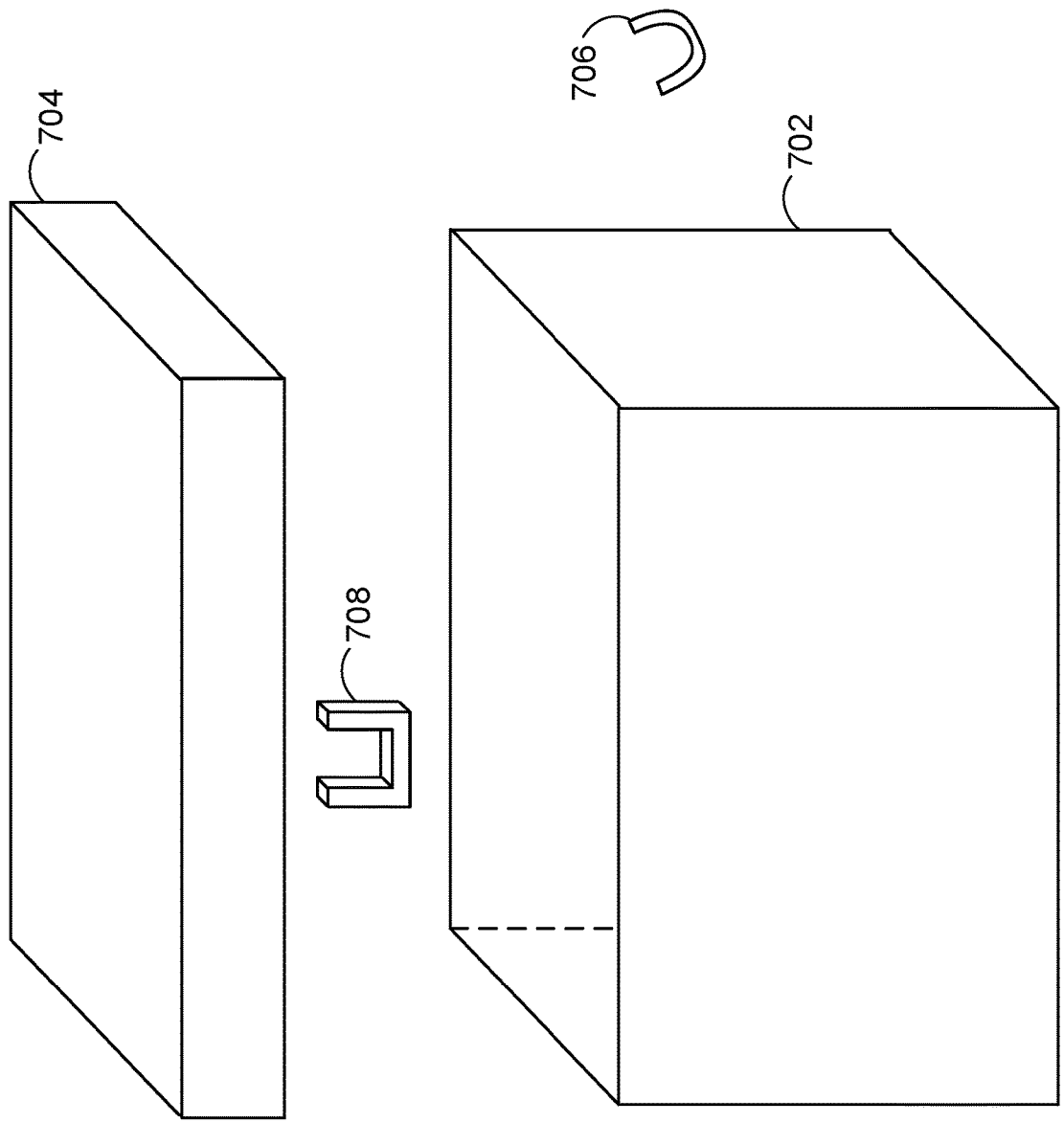
FIG. 7B is an exploded view of the object defined by the polygonal mesh shown in FIG. 8A, according to one embodiment.

FIG. 7B is an exploded view of the object defined by the polygonal mesh 700 shown in FIG. 7A, according to one embodiment. The multiple sub-objects (i.e., submeshes) are shown in FIG. 7B, including the base 702, the lid 704, the handle 706, and the latch 708. Also shown in FIG. 7B is a second handle 710 that is not visible in the perspective view shown in FIG. 7A, as the second handle 710 is occluded by the base 702 in FIG. 7A.

In some embodiments, the smaller sub-objects, such as the handles 706, 710 and latch 708 are not actually connected topologically to the base 702. Instead, they are left as completely disconnected sub-meshes that merely are near, touch, or overlap the sub-mesh representing the base 702. Note that the base 702 and lid 704 sub-meshes, which together describe the main solid shape of the chest, may not be roughly closed themselves, but are likely to be roughly closed when considered together (i.e., together the base 702 and lid 704 enclose volume). As used herein, although disconnected sub-meshes considered together may not be strictly closed in the topological sense (i.e., they do not strictly enclose volume), the disconnected sub-meshes may be considered roughly closed in the sense that their combination approximates a volumetric shape.

According to embodiments of the disclosure, although artist-authored meshes (e.g., polygonal mesh 700) typically model solid 3D objects with enclosed volume, the meshes themselves are only surfaces. In other words, a polygonal mesh and its corresponding sub-meshes are simply collections of polygonal face elements connected together in some manner, such as at their edges or vertices. Such a mesh description has no volume of its own. Still, artists use polygonal meshes to model 3D shapes by using meshes to describe the surfaces, or boundaries, of the shapes. As such, complex artist-authored objects are often constructed from many separate parts, with some 3D shapes outlined only by several disconnected submeshes that are essentially pieces of a larger shape.

Figure 7C:
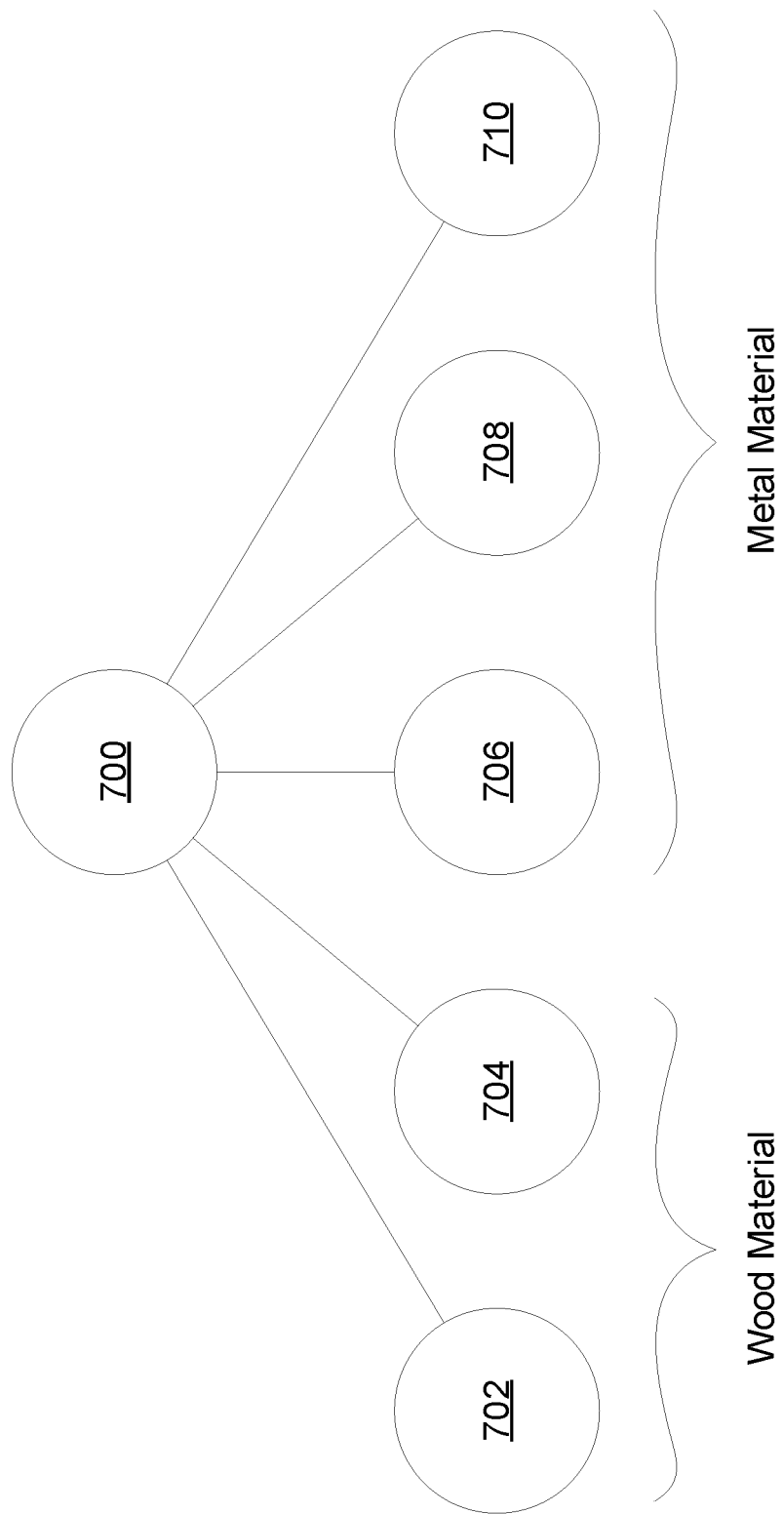
FIG. 7C is a conceptual diagram of a hierarchy of submeshes of an object, according to one embodiment.

FIG. 7C is a conceptual diagram of a hierarchy of submeshes of an object, according to one embodiment. As described, the polygonal mesh 700 in FIG. 7A is made up of multiple submeshes for small sub-objects. In one embodiment, a one-level hierarchy can be formed where each submesh is a node in the hierarchy. As described in greater detail herein, proxy LODs can be fitted to each submesh to determine whether certain shapes form a good approximation of the submesh. Traditionally simplified LODs can be generated for each submesh as well. An optimization algorithm can be executed to select one LOD per submesh to form a simplified mesh of the object.

In some embodiments, the submeshes in the hierarchy can be further formed into groups of submeshes, and proxy shapes can be fitted to the groups of submeshes. In one implementation, submeshes that are candidates for grouping can be candidates of the same "part" of the object or submeshes of the same material. In some implementations, artists can author objects as a set of "parts" that form the object. Each part can be formed of multiple submeshes. Also, each submesh may be associated with a material. In the example shown, the base 702 and lid 704 submeshes are made of wood material, and the handles 706, 710 and the latch 708 submeshes are made of metal material.

Figure 8:
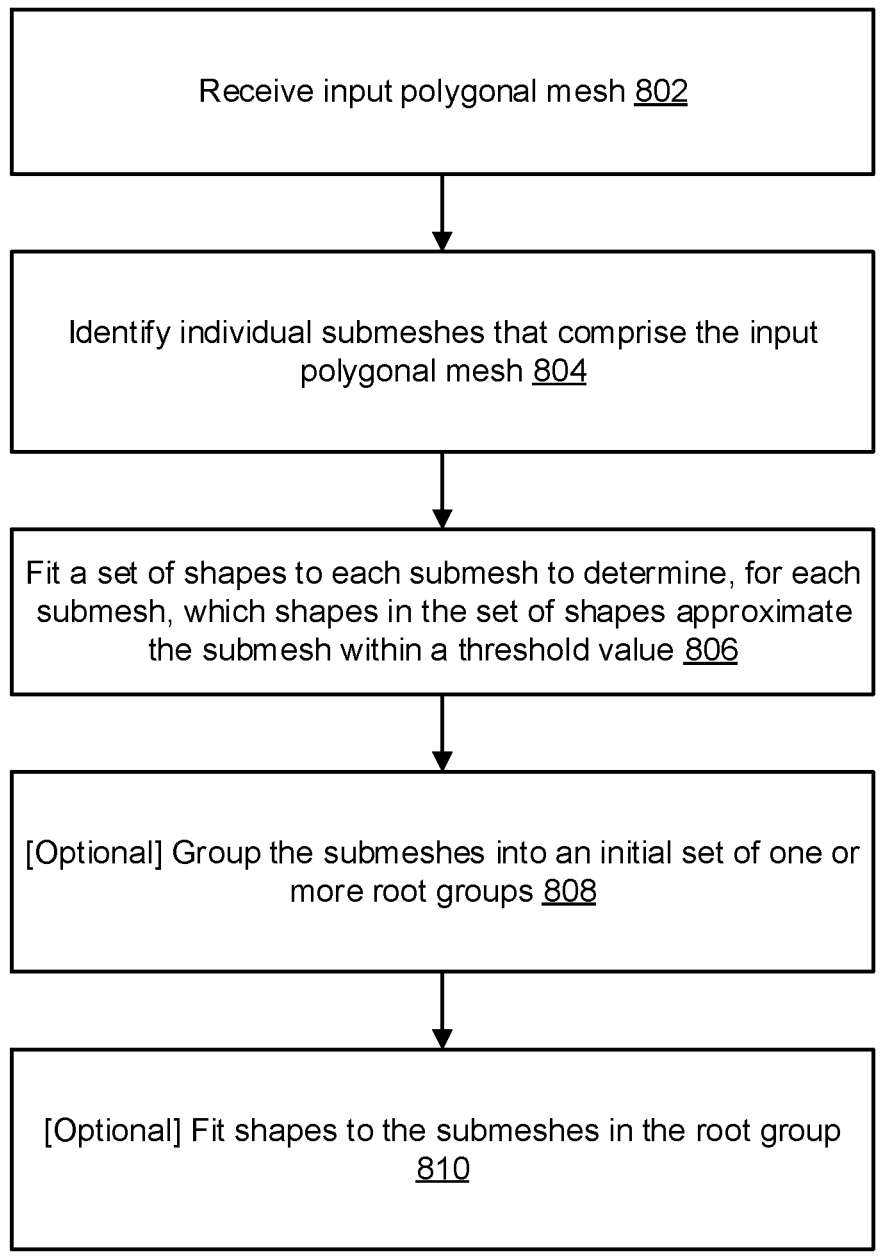
FIG. 8 is a flow diagram of method steps for grouping submeshes of an input polygonal mesh, according to one embodiment.

FIG. 8 is a flow diagram of method steps for grouping submeshes of an input polygonal mesh, according to one embodiment. In various implementations, the method can be performed by the processor 110, the graphics processor 116, or a combination of the processor 110 and the graphics processor 116.

As shown, the method begins at step 802, where the processor receives an input polygonal mesh. At step 804, the processor identifies individual submeshes that comprise the input polygonal mesh. As described, an artist-authored object can be authored as series of separate parts, where each part is comprised of one or more submeshes.

Figure 9:
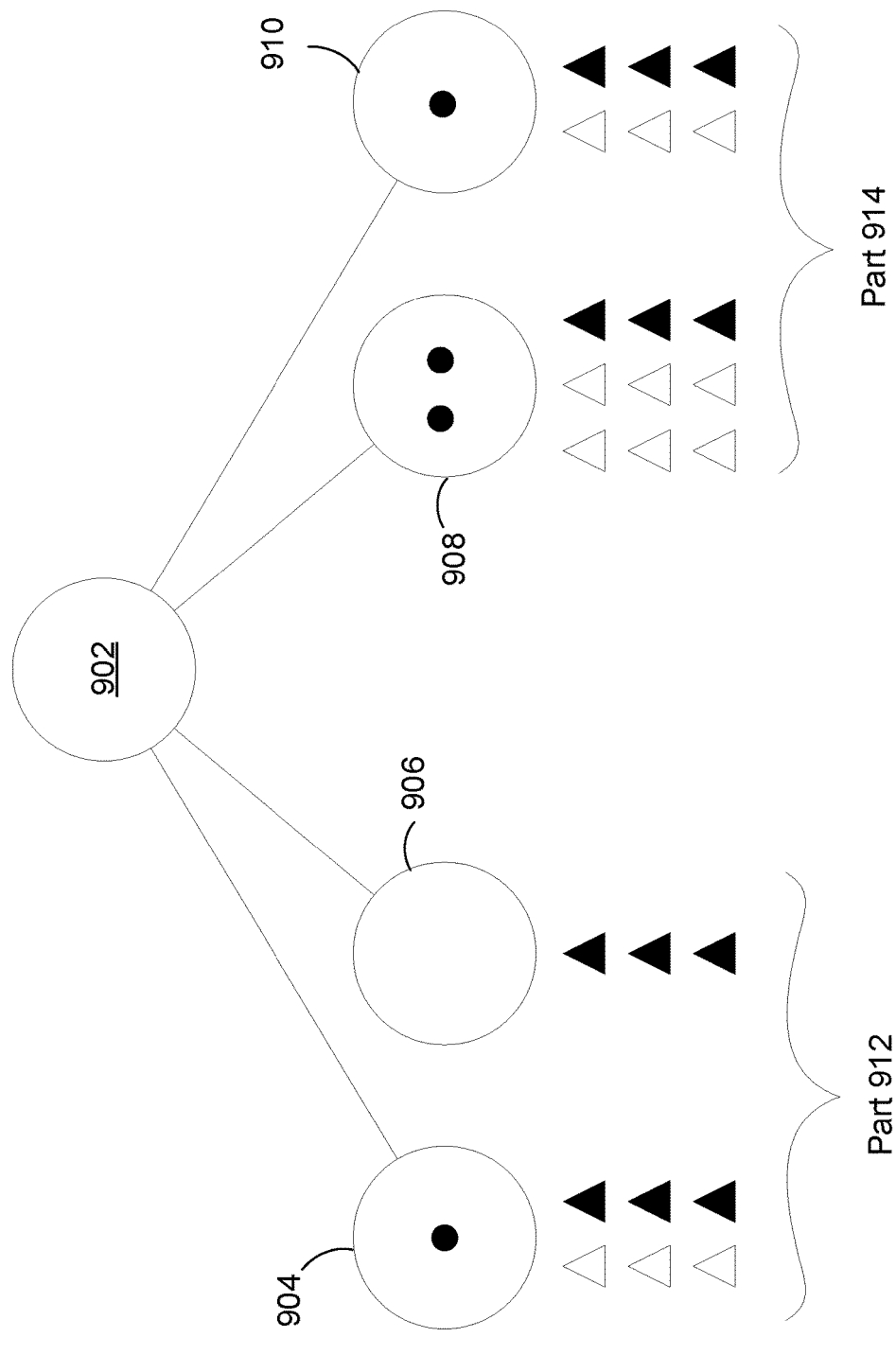
FIG. 9 is a conceptual diagram illustrating an input polygonal mesh that is divided into submeshes, according to one embodiment.

FIG. 9 is a conceptual diagram illustrating an input polygonal mesh that is divided into submeshes, according to one embodiment. The input polygonal mesh is represented by a root node 902 and four submeshes 904, 906, 908, 910. Each submesh 904, 906, 908, 910 is itself a polygonal mesh. The four submeshes 904, 906, 908, 910 together comprise the input polygonal mesh for an object.

In some implementations, the object may be modeled as a series of "parts," where each part of the object is modeled as one or more submeshes. In the example shown in FIG. 9, submeshes 904 and 906 comprise part 912, and submeshes 908 and 910 comprise part 914. In some implementations, the submeshes of the input polygonal mesh can be determined not from the artist-authored parts, but rather can be determined on the fly by identifying sets of faces that are connected by shared edges (or vertices) and identifying each of these connected sets as a submesh.

Each submesh, in some embodiments, may also be associated with a material for that submesh. In some implementations, the entire submesh comprises polygons associated with the same material; whereas, in other embodiments, one submesh may have some polygons associated with one material and other polygons associated with a second material.

The submeshes 904, 906, 908, 910 in FIG. 9 form the "leaves" of a one-level hierarchy representing the overall input polygonal mesh.

Referring back to FIG. 8, at step 806, the processor fits a set of shapes to each submesh to determine, for each submesh, which shapes in the set of shapes approximate the submesh within a threshold value. The shapes in the set of shapes may be simple fitted shapes, such as boxes, cylinders without endcaps (e.g., pipes), cylinders with endcaps, two-dimensional cards, spheres, capsules, convex hulls, more complex shapes such as voxel proxies, among other possible shapes. A "card," for example, may be a 2D planar object that is formed by taking a cross-section of an object's convex hull at the midpoint of its depth, or may be taken a cross-section of an implied volume of a submesh. In various embodiments, any bounding shape can be used.

Some embodiments try fitting each shape in the set of shapes to each submesh, and determining which shapes are good fits for the respective submeshes. Submeshes are tagged with the shape types that are found to be a good fit, for example using a threshold fidelity metric. If fitting a shape to a submesh provides a fidelity score that exceeds a threshold, the shape is determined to be a good fit for the submesh and the submesh is tagged with a label for the shape.

In one implementation of testing for fit of a shape to a submesh, first an image of the submesh is rendered, and then an image of the shape to be tested is rendered, at a series of different directions or viewing angles. Each rendered image of the submesh is compared pixel-for-pixel with the corresponding rendered image of the shape. This comparison provides a difference metric between the rendered image of the submesh and the rendered image of the shape, corresponding to a proportion of mismatched pixels. In some implementations, rendering different submeshes of the model in different colors, with or without shading, such an error metric can be extended to yield information about the impact of replacing the original submesh with the shape on silhouette, material accuracy, shading accuracy, and so forth. A fidelity metric can be computed by taking one (1) minus the error metric:

$$\text{Fidelity Metric} = 1 - \text{Error Metric}$$

The fidelity metric can then be compared to a configurable threshold value to determine whether the shape provides a good fit for the submesh, i.e., when the fidelity metric is above the threshold value, the shape is determined to be a good fit for the submesh.

In various embodiments, the fitting of shapes to submeshes can be aided by hints and simple heuristics, such that not all combinations of shapes-to-submeshes must be tested for fidelity. For example, submeshes with significant internal volume are more likely to be good fits for boxes, hulls, or voxel-based proxies, so other shapes like 2D cards can be skipped for testing.

The result of step 806 is that each submesh is tagged with zero, one, or more than one shape identifiers that provide a good fit as a proxy for the submesh.

In the example in FIG. 9, for each submesh, the number of shape tags that are a good fit for the submesh is represented by the number of dots ("•") included in the circle corresponding to the submesh. For example, submesh 904 may be associated with one shape that is a good fit, submesh 906 may be associated with zero shapes that are a good fit, submesh 908 may be associated with two shapes that are a good fit, and submesh 910 may be associated with one shape that is a good fit.

In some embodiments, the submeshes 904, 906, 908, 910 in the one-level hierarchy in FIG. 9 can be arranged in groups of submeshes, and proxy shapes can be fitted to the groups of submeshes and tested for good fit.

In some embodiments, at step 808, the processor optionally groups the submeshes into an initial set of one or more root groups. In one implementation, there is only one root group that includes all of the submeshes of the input polygonal mesh. However, in some embodiments, it can be useful to partition the set of submeshes into different root groups. The root groups can be formed based on grouping the submeshes of the input polygonal mesh by material, artist-authored part, or spatial proximity, for example. Setting the root groups in this manner ensures that submeshes in different root groups are not grouped together, and so cannot have single proxy shape fitted to them together. For example, if the input polygonal mesh is composed of multiple different parts (for example, parts 912 and 914 in FIG. 9), then it can be useful to group submeshes by part initially.

In some embodiments, instead of and/or in addition to setting root groups by part, root groups can be determined based on materials. If submeshes are associated with materials, it can be useful to group submeshes by material initially to ensure that two submeshes with different materials are not represented together by a single proxy LOD (with a single material).

In some embodiments, at step 810, the processor optionally can fit shapes to the submeshes in the root groups. In one implementation, different combinations of submeshes in a root group can be naively tested for goodness of fit to proxy shapes. In other implementations, various heuristics can be used to select candidate submeshes to test for good fit to proxy shapes. In one embodiment, a set of rules can be defined to select submeshes to test against proxy shapes. For example, a set of two or more submeshes can form a candidate group of submeshes if each submesh in the set was itself determined to be a good fit for a proxy shape, the submeshes in the set have proxy shape tags that are the same, the submeshes in the set are located near each other within a threshold or are overlapping, the submeshes in the set are on the same axis, and/or the submeshes in the set are the same size within a threshold size (e.g., for cylinder proxy shapes, the cylinders have radiuses within a threshold). After a set of submeshes is determined as a candidate for a group, a proxy shape is fitted to the group of submeshes tested for goodness of fit. The test for goodness of fit may be similar to the testing described at step 806 for a single submesh. Any groups that are found to be a good fit for a proxy shape are tagged with a tag for the shape.

Some embodiments can iteratively split out smaller groups from the initial root groups. Given an initial root group including a set of submeshes, some embodiments identify subsets that are candidates for representation by fitted proxy shapes. Each subset can be split out into a subgroup inserted as a child of the initial root group (so that the initial root group references the child subgroup instead of the submeshes which the subgroup includes). The subsets identified as candidates for splitting out as child groups are chosen to maximize the chance that simple proxy shapes fitted to them will turn out to be good fits. Some embodiments do this using a series of simple heuristics, each tailored for the kind of shape it splits out. The heuristics can use as hints the shapes with which the individual submeshes that are children of the root group are tagged. For example, a heuristic aimed at splitting out groups of submeshes that are together a good fit for a fitted cylinder shape searches first for submeshes that are tagged with cylinder shapes individually, and then identifies groups of these that lie on the same axis with similar radius. Likewise a heuristic aimed at identifying groups of submeshes well-approximated together by box shapes searches for submeshes that are tagged with oriented box shapes individually, and then identifies groups of these that are adjacent and oriented similarly. Some embodiments propose the subgroup, fit the target shape to it, and reject the subgroup if the fitted shape turns out not to be a good fit (using a threshold fidelity value). Subgroups that turn out to be good fits for shapes are tagged with those shapes, just as some embodiments tagged the individual submeshes initially.

For each initial root group, some embodiments split out as many subgroups as possible that are good fits for proxy shapes. Where multiple sets of submeshes overlap (and so conflict), some embodiments use simple rules to pick between them. For example, some embodiments prefer larger groups of submeshes over smaller groups of submeshes.

Once subgroups have been broken out from each of the initial root groups, some embodiments can optionally go on to break out further subgroups from each of the newly created groups in turn, recursively.

2. LOD Generation Stage

The result of the grouping stage is a hierarchy in which the submeshes of the model are grouped into root groups, and those root groups can be organized into subgroups, and so on. At the top of this hierarchy of groups are a set of one or more root groups chosen initially. Each submesh and each group is tagged with zero or more proxy shapes that are a good fit for the submesh or group. In the next stage, the disclosed embodiments generate LODs for the submeshes and groups based on the tagged proxy shapes. LODs are generated for each submesh or group in turn, starting with the leaf submeshes of the hierarchy and proceeding up the hierarchy in a bottom-up fashion, such that when we come to generate the LODs of a group, we have already generated LODs for all of its children.

Figure 10:
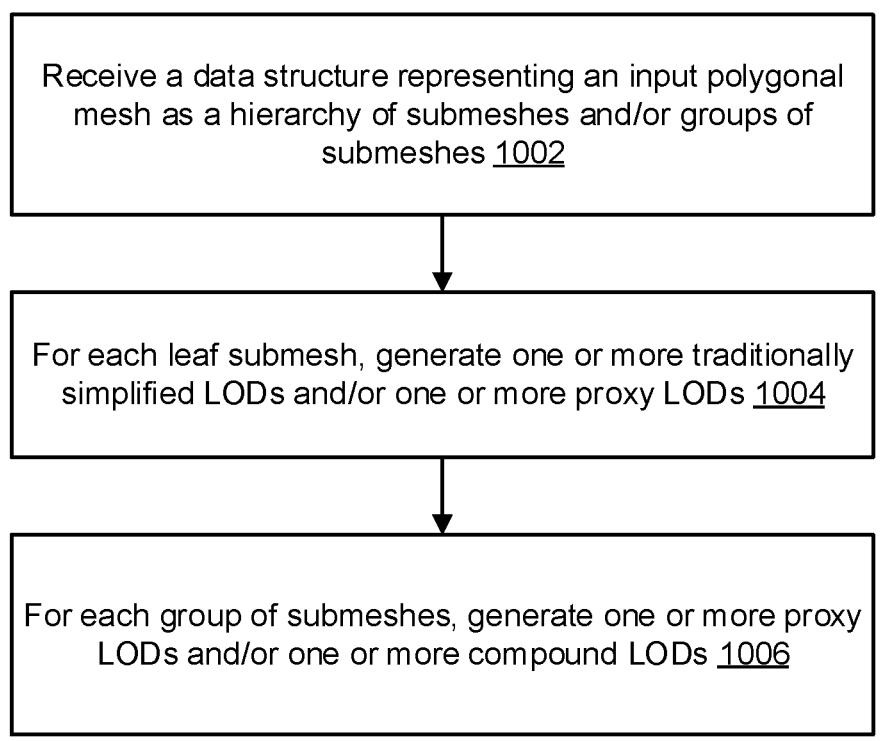
FIG. 10 is a flow diagram of method steps of generating levels-of-detail (LODs) for submeshes in a hierarchy of submeshes, according to one embodiment.

FIG. 10 is a flow diagram of method steps of generating levels-of-detail (LODs) for submeshes in a hierarchy of submeshes, according to one embodiment. In various implementations, the method can be performed by the processor 110, the graphics processor 116, or a combination of the processor 110 and the graphics processor 116.

As shown, the method begins at step 1002, where the processor receives a data structure representing an input polygonal mesh as a hierarchy of submeshes and/or groups of submeshes. In one embodiments, the method of FIG. 8 can be used to generate the hierarchy of submeshes and/or groups of submeshes.

At step 1004, for each leaf submesh, the processor generates one or more traditionally simplified LODs and/or one or more proxy LODs. Each LOD is associated with an estimated cost and benefit.

As used herein, "traditionally simplified" LODs are LODs that are generated as decimated or reduced versions of the original submeshes. Edge collapse is one popular way of traditionally simplified a mesh, for example. Other techniques for traditionally simplifying a mesh are also within the scope of the disclosure. For each leaf submesh, the traditionally simplified LODs can be generated by, for example, generating traditional LODs by applying an iterative edge collapse algorithm to the submesh. A set of traditionally simplified LODs can be generated for a given submesh at a range of triangle budgets.

For each leaf submesh, proxy LODs can be generated using a range of different methods, each suited to a particular fitted shape. For example, where a submesh is tagged with an oriented box shape, that oriented box serves as a proxy LOD. Where a submesh is tagged with an oriented cylinder shape, some embodiments generate a series of proxy LODs of cylinder shapes at a range of triangle budgets by parametrically varying the number of segments in the cylinder and/or the presence of end caps. Where a submesh is tagged with a convex hull shape, some embodiments generate simplified proxy LODs of the hull at a range of triangle budgets using edge collapse.

Referring back to FIG. 9, a hierarchy is shown with a root 902 and one level of submeshes 904, 906, 908, 910. Each of the submeshes 904, 906, 908, 910 in FIG. 9 can be considered a leaf node of the hierarchy. As described previously, submesh 904 may be associated with one shape that is a good fit, submesh 906 may be associated with zero shapes that are a good fit, submesh 908 may be associated with two shapes that are a good fit, and submesh 910 may be associated with one shape that is a good fit.

As shown in FIG. 9, a set of traditionally simplified LODs is generated for each submesh 904, 906, 908, 910. Traditionally simplified LODs in FIG. 9 correspond to the black triangle shapes. In the example shown in FIG. 9, three (3) traditionally simplified LODs are generated for each submesh 904, 906, 908, 910 at a range of different triangle budgets.

As also shown in FIG. 9, proxy LODs can be generated for each submesh that includes one or more shapes that are a good fit for the submesh. In the example shown in FIG. 9, three (3) proxy LODs are generated for each shape that is a good fit for a submesh. Proxy LODs in FIG. 9 correspond to the white triangle shapes. Thus, for submesh 904 that corresponds to one shape that is a good fit for the submesh 904, three (3) proxy LODs are generated for the one shape. For submesh 908 that corresponds to two shapes that are a good fit for the submesh 908, three (3) proxy LODs are generated for the first shape and three (3) proxy LODs are generated for the second shape. For submesh 910 that corresponds to one shape that is a good fit for the submesh 910, three (3) proxy LODs are generated for the one shape. For submesh 906 that corresponds to zero shapes that are a good fit for the submesh 906, zero proxy LODs are generated, and only the three (3) traditionally simplified LODs are available for submesh 906.

In some embodiments, the number of LODs to generate for each submesh is configurable as a configuration option. In some embodiments, the number of LODs generated per submesh is on the order of 50 to 200 LODs.

Figure 11:
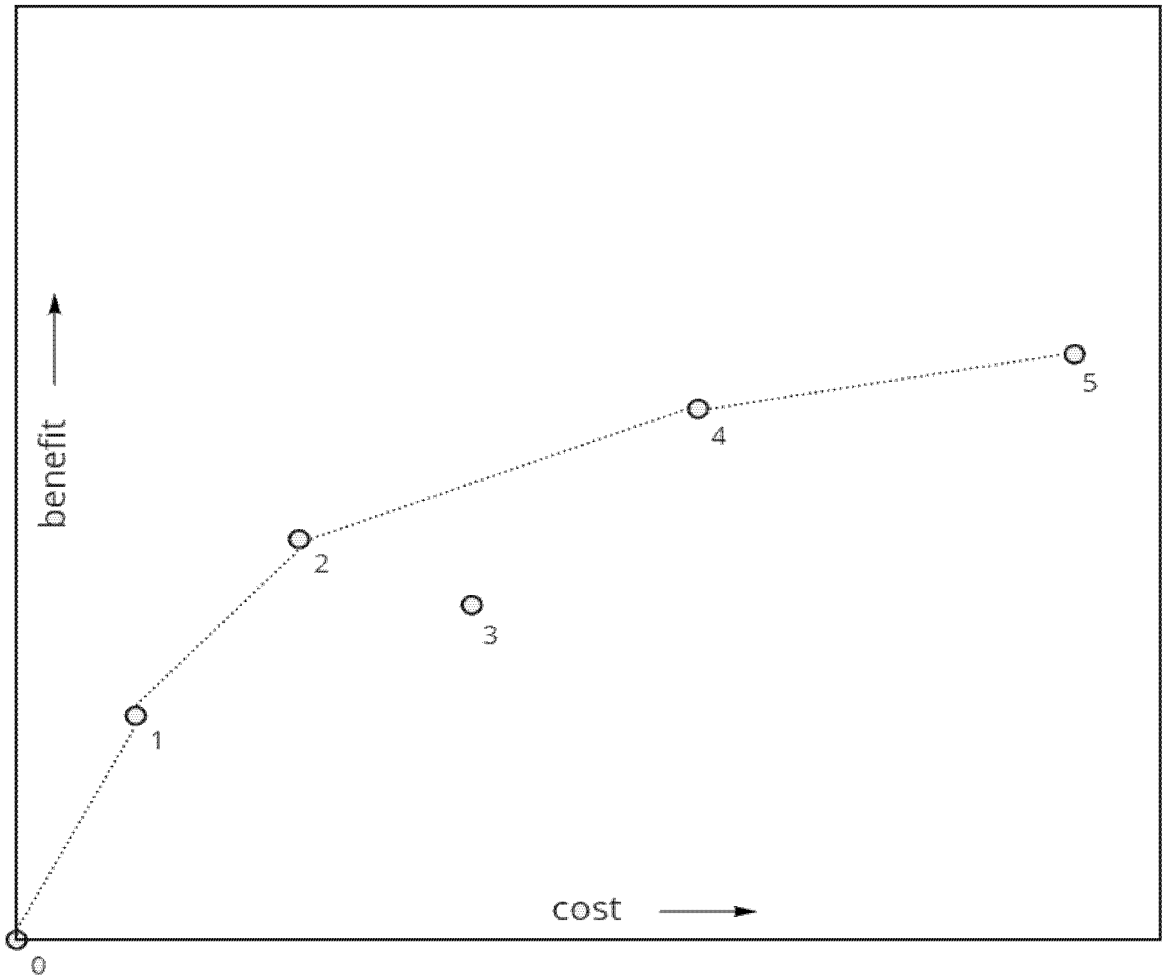
FIG. 11 is a diagram illustrating cost and benefit of a set of LODs of a submesh according to one embodiment.

In some embodiments, when generating a set of LODs for a given submesh, the submeshes can be sorted by ascending cost (i.e., number of polygons). In some implementations, any "dominated" LODs can be removed from the set of LODs for the submesh. A LOD is dominated by another LOD of the same submesh if it has greater cost than that LOD, but no greater benefit. Any solution containing a dominated LOD can be trivially improved by replacing the dominated LOD with the LOD that dominates it. After removal of dominated LODs, the LODs of each submesh are ordered such that any LOD of higher cost also provides greater benefit. FIG. 11 is a diagram illustrating cost and benefit of a set of LODs of a submesh according to one embodiment. In FIG. 11, six LODs of a submesh are plotted on a graph of increasing benefit versus increasing cost (i.e., LOD 0, LOD 1, LOD 2, LOD 3, LOD 4, LOD 5).

In one implementation, "benefit" can be computed based on a fidelity metric and an importance metric. As described previously, a fidelity metric is based on how closely a rendered image of the submesh corresponds to a rendered image of the proxy shape. An importance metric, in one embodiment, can be based on how important the submesh is to the overall object. In one implementation, a silhouette of the submesh can be generated. The size of the silhouette of the submesh is compared to the size of a silhouette of the overall object. A ratio of the sizes of the silhouettes can be computed, such that submeshes that form a larger ratio of the overall object have greater importance.

In the example in FIG. 11, LOD 3 is dominated by LOD 2 since LOD 3 has greater cost than LOD 2 but no greater benefit. As such, LOD 3 can simply be removed from consideration.

As also shown in FIG. 11, typically (but not always) successively more expensive LODs also provide diminishing returns, such that higher-cost LODs tend to have lower relative value than lower-cost LODs of the same type. This is because adding more triangles to an initially simple mesh tends to have progressively less visual impact.

Referring back to FIG. 10, at step 1006, for each group of submeshes, the processor generates one or more proxy LODs and/or one or more compound LODs.

In one embodiment, proxy LODs can be generated for a given group from the shape(s) with which the group is tagged, similar to proxy LODs generated for leaf submeshes in step 1004.

In one embodiment, compound LODs are generated by combining LODs of the children of the group at a range of budgets. In one implementation, the combinations that are selected for the compound LODs are selected by applying the Funkhouser algorithm, described below, to the LODs of the children, thereby effectively picking, for each target budget, a LOD from each child such that the total benefit of the selection is maximized without exceeding the target budget, as explained in greater detail below.

Figure 12:
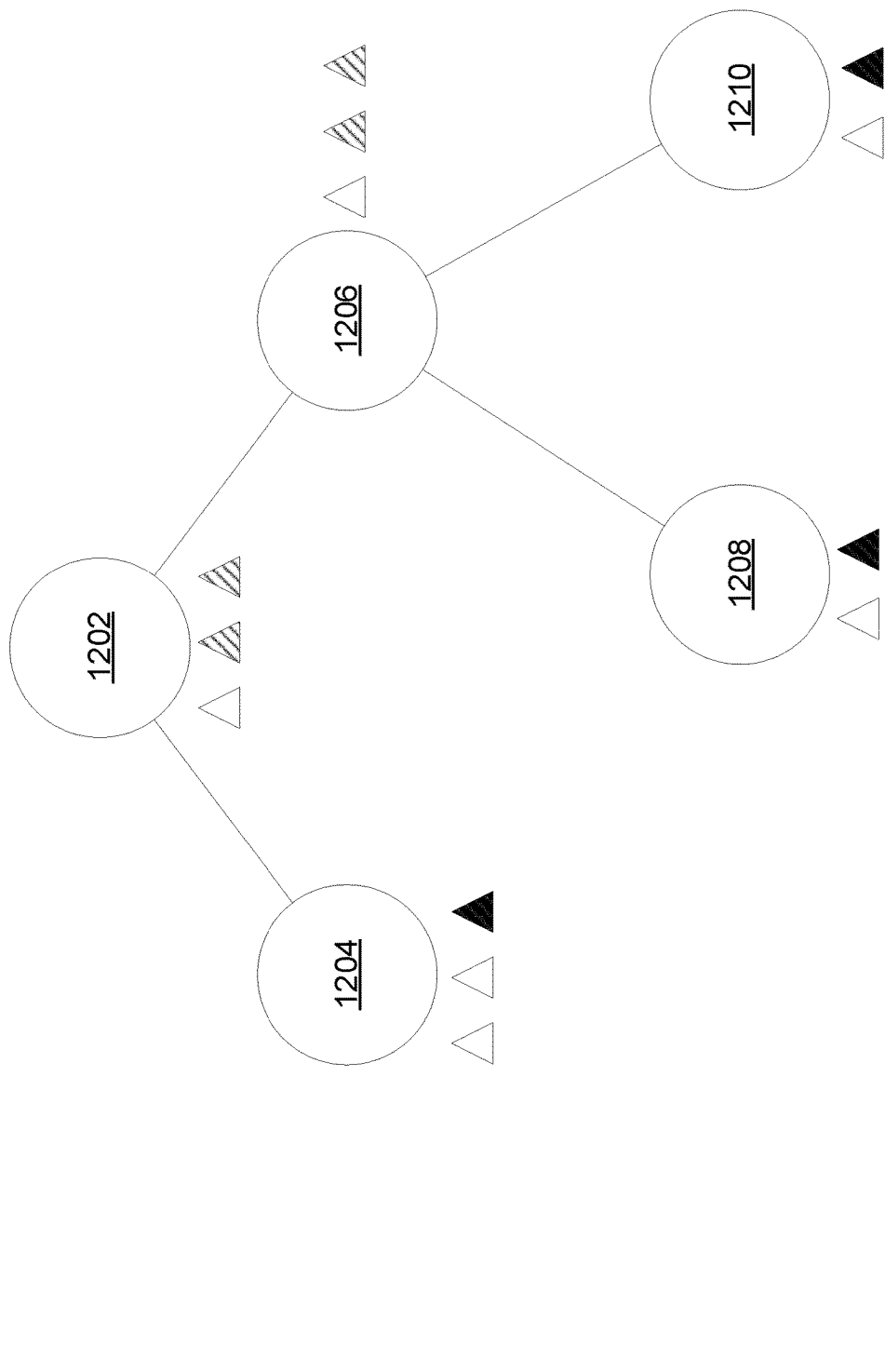
FIG. 12 is an example of a portion of a hierarchy of submeshes for a polygonal mesh, according to one embodiment.

FIG. 12 is an example of a portion of a hierarchy of submeshes for a polygonal mesh, according to one embodiment. Submesh 1202 refers to a group of submeshes that includes submesh 1204 and submesh 1206. Submesh 1204 is a leaf submesh. Submesh 1206 refers to a group of submeshes that includes submesh 1208 and submesh 1210. Submesh 1208 and submesh 1210 are both leaf submeshes.

In the example shown in FIG. 12, white triangles correspond to proxy LODs, black triangles correspond to traditionally simplified LODs, and dashed triangles correspond to compound LODs. In the example shown, the leaf submeshes 1204, 1208, 1210 may have associated with them one or more proxy LODs and one or more traditionally simplified LODs, as described in FIG. 9. For simplicity, only one traditionally simplified LOD is shown for each leaf submesh 1204, 1208, 1210. As described, a series of proxy LODs is generated for each leaf submesh, at different budgets, from shapes that are a good fit for the leaf submesh. For simplicity, two proxy LODs are shown for leaf submesh 1204 and one proxy LOD is shown for leaf submehses 1208 and 1210.

In one embodiment, for each group, "compound LODs" are formed as combinations of the LODs of the children (i.e., one for each child), as if the meshes of the child LODs were concatenated together into a single mesh. Compound LODs are then added as LODs of the group in addition to the proxy LODs of the group. For each group, because the proxy LODs for the group and the compound LODs for the group are both representations of the same portion of the overall object, their benefits can be fairly calculated and compared.

The compound LODs of each group can be generated by applying Funkhouser's algorithm to select combinations of the LODs of the group's children, at a range of budgets. This embodiment implies a kind of bottom-up generation scheme, since the compound LODs of a group's children are generated first, so that they are available for selection within compound LODs generated for the group. When compound LODs have been generated for all groups up to the top-level root groups, we can select a representation for the whole model, at any given budget, simply by picking one of the LODs of each of the top-level root groups. This can be done in the familiar way by again applying the Funkhouser algorithm to pick between LODs of the root groups.

In some embodiments, traditionally simplified LODs can be generated for groups of submeshes as well. The traditionally simplified LODs of groups are simplified versions of the portion of the object represented by the submeshes of the group.

Whenever we generate a LOD, either for a leaf submesh or a group of submeshes, the LOD is associated with an estimated cost and benefit. The cost of a LOD, in one implementation, is its triangle count. The benefit of a LOD, in one implementation, is computed as a benefit metric that takes into account the estimated relative importance of the part of the model to which the submesh or group corresponds and the estimated fidelity of the LOD itself, as described above.

In some embodiments, the estimation of the fidelity of a LOD fidelity is somewhat computationally expensive since it involves rendering a series of images from different directions and comparing them to similar reference images of the corresponding part of the original model, from the same directions. In order to allow a fine granularity of LOD budgets without having to compute fidelity scores for a large number of LODs, some embodiments employ an interpolation scheme, whereby the fidelity scores of LODs are estimated by interpolating the known fidelity scores of lower and higher budget LODs (i.e., LODs with lower and higher triangle counts in the same series). When generating a series of LODs of the same type (e.g., from the same proxy shape) at successive budgets, some embodiments buffer the generated LODs and process them in batches. Each batch is processed by a recursive method that first computes actual fidelity scores for the outermost LODs in the batch, and the LOD at the midpoint, and then compares the computed fidelity score for the midpoint LOD against a naive estimate computed by simply interpolating the computed scores for the outermost LODs. If the interpolated score is within some small tolerance of the computed score, then the range of LODs is assumed to be close to linear in fidelity, and the two subranges (from the lowest LOD to the middle LOD, and from the middle LOD to the highest LOD) are inserted with approximate fidelity scores computed by linearly interpolating across the subranges. Otherwise, the two subranges are handled recursively by again computing actual and interpolated fidelity scores for the LODs at their midpoints, and so on.

Once all LODs for a submesh or group have been generated and inserted, they form a collection of LODs for that portion of the object. Initially, the LODs are only partially sorted, since they are typically of several different kinds, generated in turn. Some embodiments sort the LODs by ascending cost (e.g., triangle count), and then by descending benefit within that. The resulting collection is sorted by cost but contains redundant dominated LODs that add nothing because they offer no greater benefit than other LODs, at no lesser cost. Some embodiments find and remove all dominated LODs, leaving a collection that is strictly ordered by ascending cost and benefit (such that a LOD with higher index always provides greater benefit, but at greater cost).

Thus, in some embodiments, the LODs of each submesh and/or group are LODs of a mixture of types. The LODs of leaf submeshes may be traditionally simplified LODs interspersed with proxy LODs, e.g., where those proxy LODs turned out to be good enough fits to dominate traditionally simplified LODs. Similarly, the LODs of groups may include compound LODs (themselves just combinations of LODs of lower-level submeshes) interspersed with proxy LODs, where those proxy LODs turned out to be good fits.

In some embodiments, an "empty LOD" may be included for each submesh or group in the hierarchy. This allows any portion of the object to effectively be omitted. These empty LODs have no mesh representation and so have zero cost. However, their benefits are not necessarily zero. Some embodiments estimate the fidelity of empty LODs as with any other LOD, and sometimes drawing no triangles can still happen to not be entirely useless, due to other submeshes that are nearby. For example, omitting a small, flat, submesh may make little difference to raycast fidelity if it is flush against a larger submesh of the same material.

3. Optimization Stage

Having built the hierarchy and then generated LODs for each its nodes, the disclosed system and method are in a position to pick a final simplified mesh representation from the generated LODs. In implementations where the submeshes are organized into root groups, it suffices to pick one of the LODs of each of the root groups, since those LODs in combination constitute a representation of the whole model. Although some embodiments do not explicitly consider LODs of any nodes other than LODs of the root groups, the LODs of the lower levels of the hierarchy are considered implicitly by the consideration of compound LODs that potentially contain them at the root group level.

One embodiment applies the Funkhouser algorithm to the LODs of the root groups to pick a selection of them subject to the total budget.

In one implementation, the Funkhouser algorithm provides a solution to what is known as the "knapsack problem," in which, generically speaking, a knapsack of a certain size must be filled with a selection picked from a range of available items of different profits (benefits) and sizes (costs), maximizing the total profit of the selection. In one implementation of the present disclosure, the Funkhouser algorithm takes as input the benefit (e.g., positive impact on rendering fidelity) and cost of each LOD. In one embodiment, the cost of rendering a LOD can be approximated simply by its triangle count. Other metrics for cost are also within the scope of the disclosure. The Funkhouser algorithm selects among the LODs of the submeshes to form a complete representation of the object, where the output is a selection of LODs whose total benefit is near-optimal. The optimization is performed once per frame, and the knapsack size is the total triangle budget for the frame.

In one implementation, the available items are the LODs of the submeshes. The benefit of each LOD is estimated (i.e., positive impact on rendering fidelity) using a metric that takes into account, among other things, the size of the submesh and the quality level of the LOD. The cost of rendering a submesh is approximated simply by its triangle count. The Funkhouser algorithm can be used to apply a simple greedy hill-climbing algorithm that starts with no LODs selected (or, equivalently, with a zero-triangle empty LOD selected for each submesh) and then improves this selection by iteratively replacing the selected LOD of one submesh with another, more expensive, LOD of the same submesh. The iteration stops when no further replacements can be afforded (or none are available).

In each step, the replacement selected is that which can be afforded and which has the greatest relative value. The value of a LOD is the ratio of its benefit to its cost, and the relative value of a replacement of one LOD with another is the ratio of the increase in benefit to the increase in cost.

After the iteration completes, the solution found is compared to the solution consisting of only the affordable LOD with highest benefit, and that solution is chosen instead if its total benefit is greater. This last check is a safeguard against a pathological case in which a single expensive LOD that can only just be afforded is the best solution. The augmented algorithm can be shown to find a solution that is always at least half as good as the optimal solution; in practice it's usually much closer.

It is noted that the grouping stage and LOD generation stage can be independent of the target triangle budget (ignoring for a moment that we might choose to omit LODs we know from the outset are too expensive). Only the optimization stage, in which we pick an optimized solution, depends on the triangle budget. This means that grouping stage and LOD generation stage could be precomputed and their results stored, in order to more rapidly try out different solutions at different budgets at the optimization stage (for example, with a slider for triangle budget in an artist-facing tool).

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein.

All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

It should be understood that the original applicant herein determines which technologies to use and/or productize based on their usefulness and relevance in a constantly evolving field, and what is best for it and its players and users. Accordingly, it may be the case that the systems and methods described herein have not yet been and/or will not later be used and/or productized by the original applicant. It should also be understood that implementation and use, if any, by the original applicant, of the systems and methods described herein are performed in accordance with its privacy policies. These policies are intended to respect and prioritize player privacy, and are believed to meet or exceed government and legal requirements of respective jurisdictions. To the extent that such an implementation or use of these systems and methods enables or requires processing of user personal information, such processing is performed (i) as outlined in the privacy policies; (ii) pursuant to a valid legal mechanism, including but not limited to providing adequate notice or where required, obtaining the consent of the respective user; and (iii) in accordance with the player or user's privacy settings or preferences. It should also be understood that the original applicant intends that the systems and methods described herein, if implemented or used by other entities, be in compliance with privacy policies and practices that are consistent with its objective to respect players and user privacy.

What is claimed is:

1. A method for generating a simplified mesh, the method comprising:
   receiving, by one or more processors, an input mesh, wherein the input mesh comprises a polygonal mesh that is a computer representation of a three-dimensional (3D) object;
   identifying, by the one or more processors, one or more submeshes of the input mesh, wherein each submesh of the one or more submeshes comprises a polygonal mesh;
   fitting, by the one or more processors, a set of shapes to the one or more submeshes to determine which shapes in the set of shapes approximate which submeshes of the one or more submeshes within a threshold value;
   for each submesh that is associated with at least one shape that approximates the submesh within the threshold value, generating, by the one or more processors, a set of proxy levels-of-detail (LODs) for the submesh, wherein each proxy LOD is a polygonal mesh corresponding to the at least one shape that approximates the submesh;

generating, by the one or more processors, for each submesh of the one or more submeshes, a set of traditionally simplified levels-of-detail (LODs) for the submesh, wherein each traditionally simplified LOD is a polygonal mesh generated based on simplifying the submesh; and generating, by the one or more processors, the simplified mesh based on selecting one proxy LOD or one traditionally simplified LOD for each submesh of the one or more submeshes.

2. The method according to claim 1, wherein, for a given submesh, each traditionally simplified LOD of the given submesh is a polygonal mesh generated based on simplifying the submesh via edge collapse operations.

3. The method according to claim 1, further comprising:
grouping the one or more submeshes into an initial set of one or more root groups;
for a first root group of the one or more root groups, identifying a subset of submeshes of the first root group, wherein the subset of submeshes corresponds to a shape in the set of shapes that approximates the subset of submeshes within the threshold value; and
generating a proxy LOD for the subset of submeshes of the first root group corresponding to the shape in the set of shapes that approximates the subset of submeshes.

4. The method according to claim 3, further comprising:
generating a compound LOD for the subset of submeshes, wherein the compound LOD is formed by combining LODs of the submeshes in the subset of submeshes.

5. The method according to claim 3, wherein the one or more submeshes are grouped into the initial set of one or more root groups based on being associated with a same material or being associated with a same part of the 3D object represented by the input mesh.

6. The method according to claim 1, wherein each proxy LOD and each traditionally simplified LOD is associated with a cost metric and a benefit metric, wherein the cost metric corresponds to an estimated cost of rendering the proxy LOD or the traditionally simplified LOD, and the benefit metric is based on a fidelity metric and an importance metric of the proxy LOD or the traditionally simplified LOD.

7. The method according to claim 6, wherein the estimated cost of rendering the proxy LOD or the traditionally simplified LOD corresponds to a number of polygons of the proxy LOD or the traditionally simplified LOD.

8. The method according to claim 6, wherein the fidelity metric for a given proxy LOD or a given traditionally simplified LOD is based on comparing a first rendered image of the given proxy LOD or the given traditionally simplified LOD with a second rendered image of the submesh corresponding to the given proxy LOD or the given traditionally simplified LOD.

9. The method according to claim 6, wherein the importance metric for a given proxy LOD or a given traditionally simplified LOD is based on comparing a size of a silhouette of the given proxy LOD or the given traditionally simplified LOD with a size of a silhouette of the submesh corresponding to the given proxy LOD or the given traditionally simplified LOD.

10. The method according to claim 6, wherein generating the simplified mesh based on selecting one proxy LOD or one traditionally simplified LOD for each submesh of the one or more submeshes is based on applying an optimization algorithm based on the cost metrics and benefit metrics of the proxy LODs and the traditionally simplified LODs of the one or more submeshes.

11. The method according to claim 1, wherein the set of shapes includes: a box shape, a cylinder shape, a sphere shape, a capsule shape, a convex hull shape, a two-dimensional card shape, or a voxel proxy shape.

12. A non-transitory computer-readable storage medium storing instructions that, when executed by one or more processors, causes a computing device to generate a simplified mesh, by performing the steps of:
receiving an input mesh, wherein the input mesh comprises a polygonal mesh that is a computer representation of a three-dimensional (3D) object;
identifying one or more submeshes of the input mesh, wherein each submesh of the one or more submeshes comprises a polygonal mesh;
fitting a set of shapes to the one or more submeshes to determine which shapes in the set of shapes approximate which submeshes of the one or more submeshes within a threshold value;
for each submesh that is associated with at least one shape that approximates the submesh within the threshold value, generating a set of proxy levels-of-detail (LODs) for the submesh, wherein each proxy LOD is a polygonal mesh corresponding to the at least one shape that approximates the submesh;
generating for each submesh of the one or more submeshes, a set of traditionally simplified levels-of-detail (LODs) for the submesh, wherein each traditionally simplified LOD is a polygonal mesh generated based on the simplifying submesh; and
generating the simplified mesh based on selecting one proxy LOD or one traditionally simplified LOD for each submesh of the one or more submeshes.

13. The computer-readable storage medium according to claim 12, the steps further comprising:
grouping the one or more submeshes into an initial set of one or more root groups;
for a first root group of the one or more root groups, identifying a subset of submeshes of the first root group, wherein the subset of submeshes corresponds to a shape in the set of shapes that approximates the subset of submeshes within the threshold value; and
generating a proxy LOD for the subset of submeshes of the first root group corresponding to the shape in the set of shapes that approximates the subset of submeshes.

14. The computer-readable storage medium according to claim 13, the steps further comprising:
generating a compound LOD for the subset of submeshes, wherein the compound LOD is formed by combining LODs of the submeshes in the subset of submeshes.

15. The computer-readable storage medium according to claim 13, wherein the one or more submeshes are grouped into the initial set of one or more root groups based on being associated with a same material or being associated with a same part of the 3D object represented by the input mesh.

16. The computer-readable storage medium according to claim 12, wherein each proxy LOD and each traditionally simplified LOD is associated with a cost metric and a benefit metric, wherein the cost metric corresponds an estimated cost of rendering the proxy LOD or the traditionally simplified LOD, and the benefit metric is based on a fidelity metric and an importance metric of the proxy LOD or the traditionally simplified LOD.

17. The computer-readable storage medium according to claim 16,
- wherein the estimated cost of rendering the proxy LOD or the traditionally simplified LOD corresponds to a number of polygons of the proxy LOD or the traditionally simplified LOD;
- wherein the fidelity metric for a given proxy LOD or a given traditionally simplified LOD is based on comparing a first rendered image of the given proxy LOD or the given traditionally simplified LOD with a second rendered image of the submesh corresponding to the given proxy LOD or the given traditionally simplified LOD; and
- wherein the importance metric for a given proxy LOD or a given traditionally simplified LOD is based on comparing a size of a silhouette of the given proxy LOD or the given traditionally simplified LOD with a size of a silhouette of the submesh corresponding to the given proxy LOD or the given traditionally simplified LOD.

18. The computer-readable storage medium according to claim 16, wherein generating the simplified mesh based on selecting one proxy LOD or one traditionally simplified LOD for each submesh of the one or more submeshes is based on applying an optimization algorithm based on the cost metrics and benefit metrics of the proxy LODs and the traditionally simplified LODs of the one or more submeshes.

19. The computer-readable storage medium according to claim 12, wherein the set of shapes includes: a box shape, a cylinder shape, a sphere shape, a capsule shape, a convex hull shape, a two-dimensional card shape, or a voxel proxy shape.

20. A device for generating a simplified mesh, the device comprising:
- a memory storing instructions; and
- one or more processors configured to the execute the instructions to cause the device to:
  - receive an input mesh, wherein the input mesh comprises a polygonal mesh that is a computer representation of a three-dimensional (3D) object;
  - identify one or more submeshes of the input mesh, wherein each submesh of the one or more submeshes comprises a polygonal mesh;
  - fit a set of shapes to the one or more submeshes to determine which shapes in the set of shapes approximate which submeshes of the one or more submeshes within a threshold value;
  - for each submesh that is associated with at least one shape that approximates the submesh within the threshold value, generate a set of proxy levels-of-detail (LODs) for the submesh, wherein each proxy LOD is a polygonal mesh corresponding to the at least one shape that approximates the submesh;
  - generate for each submesh of the one or more submeshes, a set of traditionally simplified levels-of-detail (LODs) for the submesh, wherein each traditionally simplified LOD is a polygonal mesh generated based on simplifying the submesh; and
  - generate the simplified mesh based on selecting one proxy LOD or one traditionally simplified LOD for each submesh of the one or more submeshes.

* * * * *